United States Patent
Nunna et al.

(10) Patent No.: US 10,959,130 B2
(45) Date of Patent: Mar. 23, 2021

(54) QUALITY OF SERVICE CLASS INDICATOR STRUCTURE AND CORRESPONDING CONTROLLERS AND CONTROL METHODS

(71) Applicant: Huawei Technologies Co., Ltd., Shenzhen (CN)

(72) Inventors: Swaroop Nunna, Munich (DE); Karthikeyan Ganesan, Munich (DE); Qing Wei, Munich (DE); Mohamed Gharba, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 14 days.

(21) Appl. No.: 16/362,342

(22) Filed: Mar. 22, 2019

(65) Prior Publication Data
US 2019/0223054 A1 Jul. 18, 2019

Related U.S. Application Data

(63) Continuation of application No. PCT/EP2016/072749, filed on Sep. 23, 2016.

(51) Int. Cl.
*H04W 28/24* (2009.01)
*H04W 28/02* (2009.01)
(Continued)

(52) U.S. Cl.
CPC ............ *H04W 28/24* (2013.01); *H04L 47/14* (2013.01); *H04L 47/24* (2013.01);
(Continued)

(58) Field of Classification Search
None
See application file for complete search history.

(56) References Cited

U.S. PATENT DOCUMENTS 9,356,911 B1    5/2016  Velusamy et al.
2012/0155418 A1* 6/2012  Ludwig ............ H04W 72/1257
                                                370/329
(Continued)

FOREIGN PATENT DOCUMENTS

CN  101326845 A  12/2008
WO  2016112958 A1  7/2016

OTHER PUBLICATIONS

"3rd Generation Partnership Project; Technical Specification Group Services and System Aspects; Study on Architecture for Next Generation System (Release 14)," 3GPP TR 23.799 V0.8.0, pp. 1-423, XP51172426A, 3rd Generation Partnership Project—Valbonne, France (Sep. 2016).

*Primary Examiner* — Charles C Jiang
*Assistant Examiner* — Saad Khawar
(74) *Attorney, Agent, or Firm* — Leydig, Voit & Mayer, Ltd.

(57) ABSTRACT

A quality of service (QoS) class indicator (QCI) structure is provided, wherein the QCI structure is arranged to control communication in a communication network and to classify data flows in the communication network, and wherein the QCI structure comprises: an identifier of a provider of an industry vertical and/or of a service in the communication network; and a QoS parameter set for the provider of the industry vertical and/or of the service. A QoS central controller is configured to manage QoS classes in the communication network according to the QCI structure. Each one of one or more QoS sub-network controllers is arranged to configure devices in a respective sub-network of the communication network according to the QCI structure.

19 Claims, 22 Drawing Sheets

(51) Int. Cl.
- *H04L 12/801* (2013.01)
- *H04L 12/857* (2013.01)
- *H04L 12/927* (2013.01)
- *H04L 12/851* (2013.01)
- *H04L 12/841* (2013.01)
- *H04W 28/04* (2009.01)

(52) U.S. Cl.
CPC ...... *H04L 47/2441* (2013.01); *H04L 47/2491* (2013.01); *H04L 47/283* (2013.01); *H04L 47/805* (2013.01); *H04W 28/0263* (2013.01); *H04W 28/0268* (2013.01); *H04W 28/04* (2013.01)

(56) References Cited

U.S. PATENT DOCUMENTS

| | | | |
|---|---|---|---|
| 2012/0314568 A1* | 12/2012 | Tan | H04L 47/2491 370/230 |
| 2015/0281999 A1 | 10/2015 | Zhu et al. | |
| 2016/0112896 A1 | 4/2016 | Karampatsis et al. | |
| 2016/0212654 A1* | 7/2016 | Itoh | H04W 40/12 |
| 2018/0359322 A1* | 12/2018 | Dong | H04L 67/16 |
| 2019/0037409 A1* | 1/2019 | Wang | H04W 28/06 |
| 2019/0132781 A1* | 5/2019 | Arnold | H04W 72/0446 |

* cited by examiner

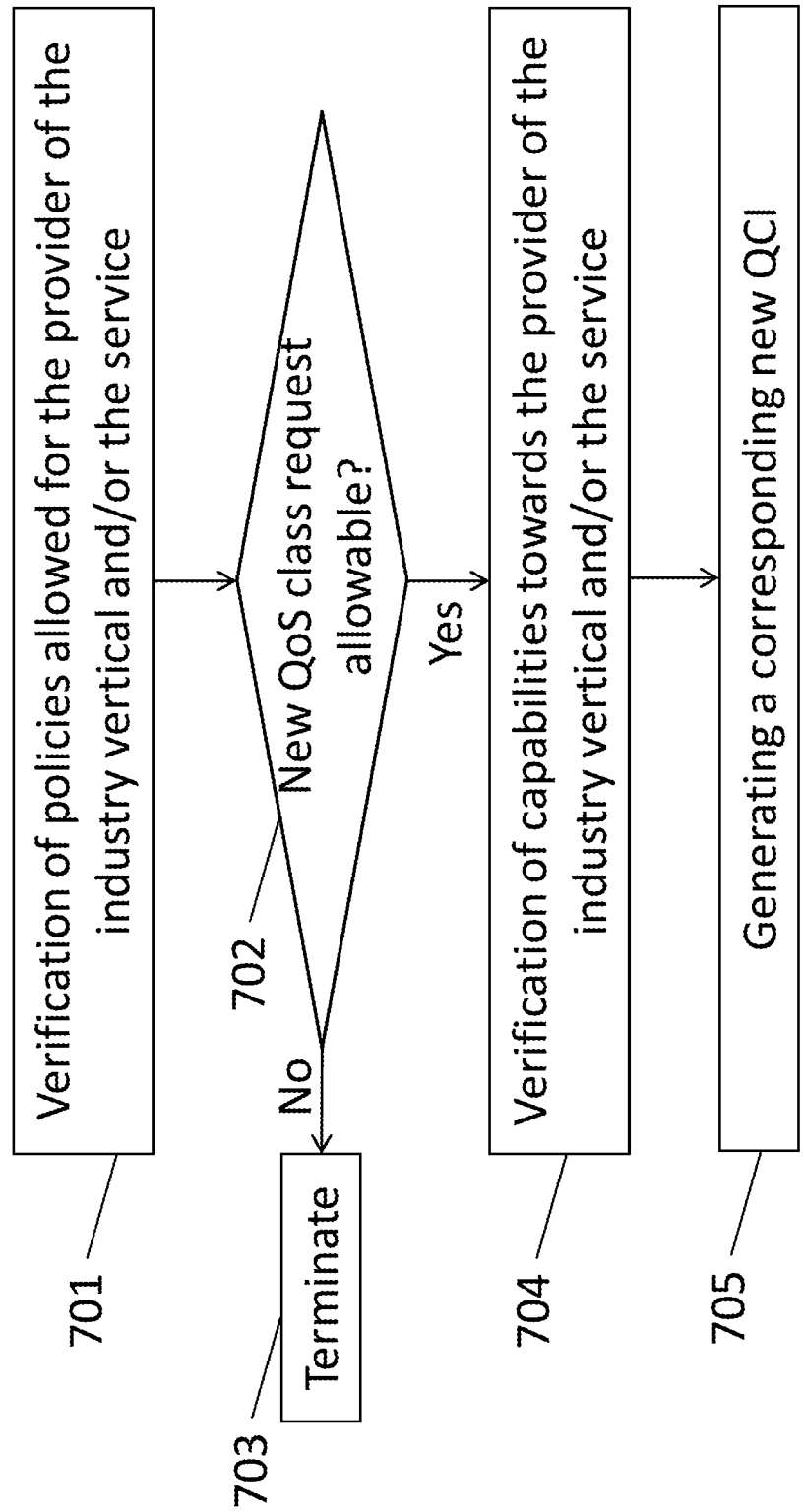

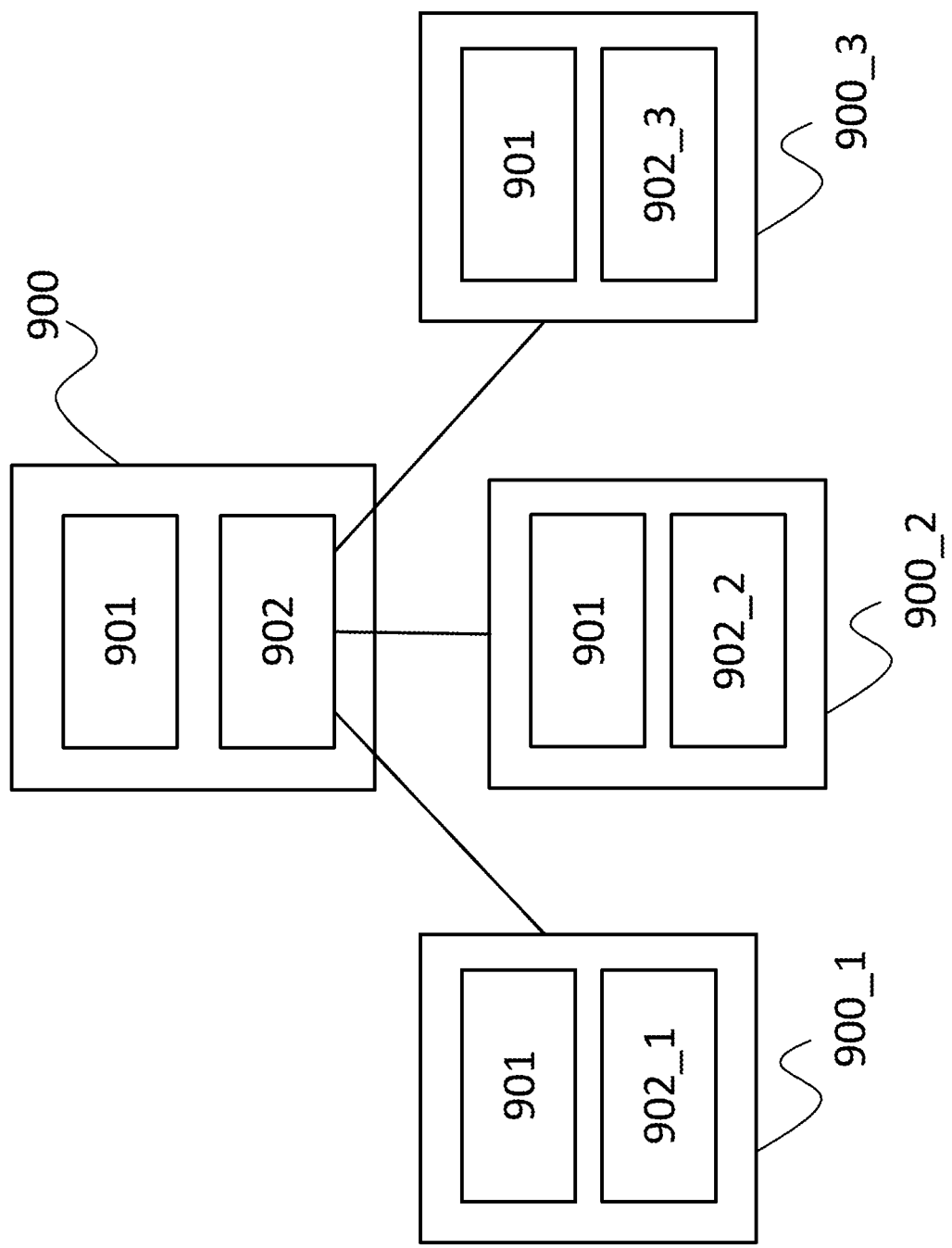

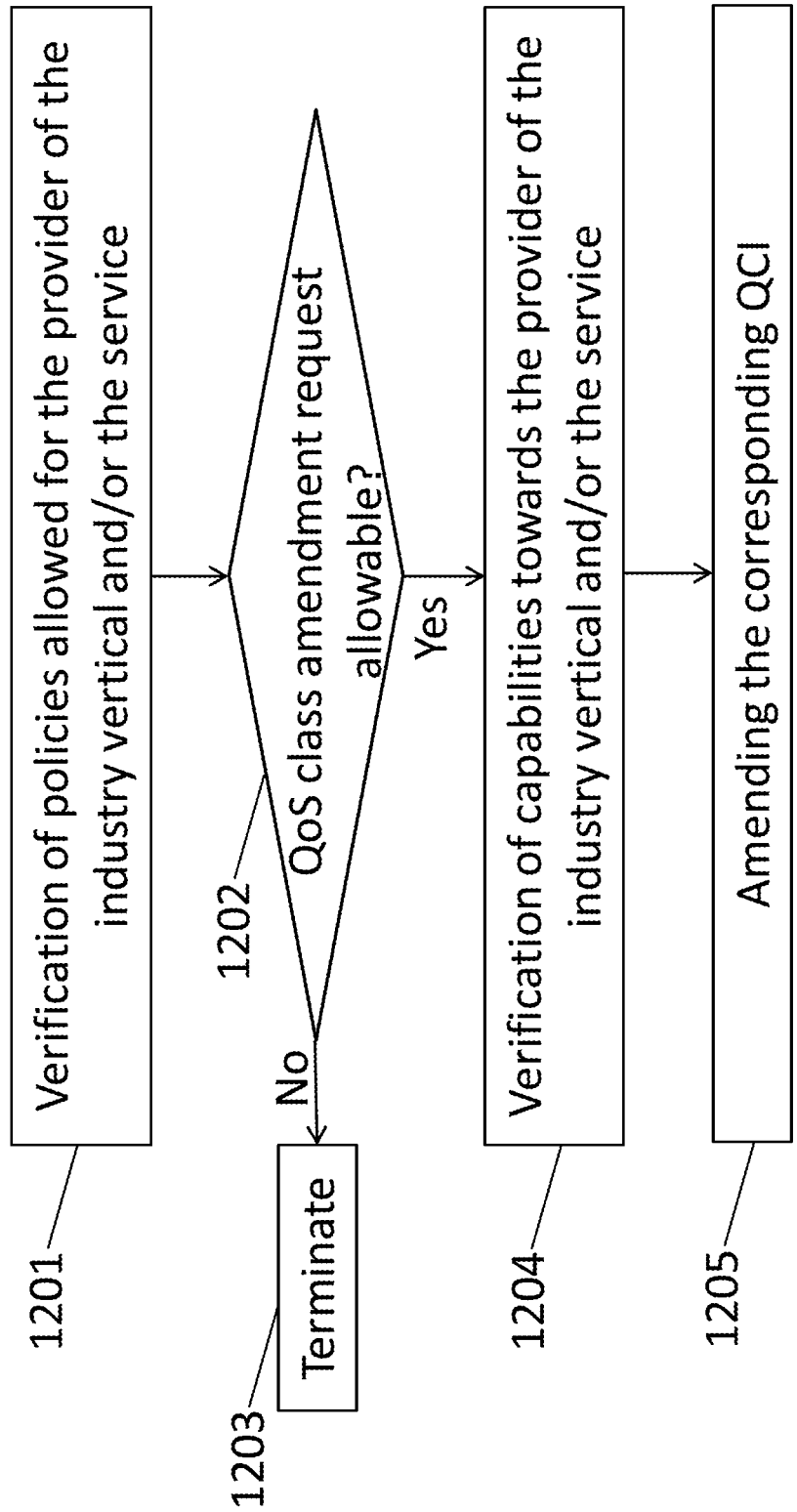

QUALITY OF SERVICE CLASS INDICATOR STRUCTURE AND CORRESPONDING CONTROLLERS AND CONTROL METHODS

CROSS-REFERENCE TO RELATED APPLICATIONS

This application is a continuation of International Application No. PCT/EP2016/072749, filed on Sep. 23, 2016, the disclosure of which is hereby incorporated by reference in its entirety.

TECHNICAL FIELD

Embodiments of the present disclosure are directed to a quality of service class indicator structure and to corresponding controllers and control methods arranged to control communication processes in a communication network by use of the quality of service class indicator structure. Further, the present disclosure relates to a correspondingly arranged computer program products and to a correspondingly arranged computer-readable media.

BACKGROUND

Next generation communication networks are envisioned to incorporate a wide variety of services from multiple industry verticals. On one hand, these services are expected to co-exist in the same communication network and to share the resources of the communication network. On the other, the services being from different industry verticals have varying set of requirements and often tend to require fine-grained Quality of Service (QoS). The 5th generation mobile network or 5th generation wireless system (5G)) represents a next generation communication network and denotes a next major phase of mobile telecommunications standards beyond the current 4G/IMT-Advanced standards. 5G will create an ecosystem for technical and business innovation involving vertical markets or industries such as automotive, energy, food and agriculture, city management, government, healthcare, manufacturing, transportation, media, entertainment, and many more. 5G will serve a larger portfolio of applications with a corresponding multiplicity of requirements ranging from high reliability to ultra-low latency going through high bandwidth and mobility. Thus, via 5G, not only various service providers will offer services in the communication network, but also several industry verticals will be present there. Through the implementation of 5G, the variety of transmitted data flows and, consequently, also the transmitted data amounts will increase. Therefore, techniques will be required that are capable to manage the different data flows in an efficient way to enable a fast and efficient communication among different devices in the communication network, the different devices being arranged for executing communication with regard to different services and/or with regard to different industry verticals in the communication network.

This situation becomes further complex in the context of 5G where the communication network comprises one or more different core networks and one or more Radio Access Networks (RAN) with varying degrees of capabilities.

QoS provisioning is currently done in LTE via Quality Class Indicator (QCI), which in turn is a statically defined classification of end-to-end packet loss and latency tolerance. The QCI is defined per bearer type and happens to be an inherent part of the bearer establishment process. This is further enforced via Traffic Flow Templates (TFT) while the QCI at eNodeB specifies the forwarding treatment (e.g. scheduling weights, admission thresholds, queue management thresholds, link-layer protocol configuration, etc.). Generally, QCI is a mechanism for ensuring that the bearer traffic or a data flow is allocated appropriate QoS. Different bearer traffic or different data flows respectively require different QoS and, therefore, different QCI values.

QCI in its current state is a simply an index of packet loss and latency. This is leading to some of the critical challenges:

QCI only represents packet loss and latency. However, for services from vertical industries the QoS parameters extend beyond these two key performance indicators (KPIs). For example, in Car-2-Car communications, jitter and message frequency are two of the essential QoS KPIs in addition to packet loss and latency. This is unfortunately not sufficiently represented in the present QCI system.

9 QCIs were originally introduced in LTE. The 9 QCIs were later expanded to 13 in Release-12 with the introduction of services from Machine Type Communications (MTC). Generally, the QCIs are provided in a table of QCIs. For supporting industry verticals, the QCI table has to be expanded as in the above-mentioned case where the 9 QCIs were later expanded to 13 QCIs. Such a vertical expansion of QCI table is not a sustainable solution since hundreds of new service types from vertical industries are envisioned to be introduced in 5G.

The existing QoS class provisioning is not future proof when one considers the proposed 5G concepts. In 5G, a unified air interface is designed that could be sliced for various verticals with the slices being dynamically re-configurable. Furthermore, a service from one vertical industry may have a higher priority when compared to the service from another vertical even if they are similar in nature. For example, transmission of sensor data from Car-2-Car communications might have a higher priority over the transmission of sensor data of IoT (Internet of Things).

Considering these aspects of 5G, QoS class provisioning in future should meet at least some of the following aspects:

Support network slicing for different verticals with network slices being introduced and torn down dynamically;

Facilitate QoS support for services within the slices of the verticals;

Take into consideration Allocation-Retention-Policy (ARP) management, load balancing across industries, access and core network capabilities etc.; and/or Be compatible with the individual QoS capabilities of different access and core networks.

Thus, further methodologies are required for handling different data flows in a communication networks according to different QoS classes.

SUMMARY

An object is provision of devices and methods that enable an improved handling of different data flows in a communication network.

An object is achieved by the solution provided in the enclosed independent claims. Advantageous implementations are further defined in the respective dependent claims, in the description, and/or in the appended figures.

The present disclosure provides an architecture that facilitates the provisioning of QoS classes. The present disclosure provides service and/or industry vertical providers an interface to directly add/alter QoS classes in the communication network while retaining the authorization for such additions/alterations with the mobile network operators (MNOs). This significantly reduces the time needed for service and/or industry vertical deployments. Furthermore, the architecture, automatically translates the QoS class requirements into subsets of requirements for each one of the core and RAN components involved in a particular service and/or industry vertical. The translation is performed by taking into consideration the individual capabilities of the different core and RAN components in the communication network.

According to a first aspect, a quality of service, QoS, class indicator, QCI, structure is provided, wherein the QCI structure is arranged to control communication in a communication network and to classify data flows in the communication network, and wherein the QCI structure comprises: an identifier of a provider of an industry vertical and/or of a service in the communication network; and a QoS parameter set for the provider of the industry vertical and/or of the service.

The implementation of the QCI structure in the communication network allows an easy and efficient handling of different data flows in a communication network. The implementation of the QCIs according to the QCI structure, i.e. the arrangement of the QCIs as defined by the QCI structure allows an easy, efficient, and powerful handling of the growing amount of different data flows in a communication network. The addition, amending, and/or deleting of QCIs is possible in an easy way. The QCI and, thus, the QOS class addition, amending, and/or deleting processes may be triggered by the providers of industry verticals and/or services in the communication network. The devices and methods arranged to execute communication processes in the communication network according to the QCIs, having QCIs arranged according to the QCI structure, are capable to exploit the full variety of the services and/or industry verticals in the communication network and, at the same time, to handle the different data flows in a correct and efficient way despite the presence of one or more core sub-networks and one or more RAN sub-networks of the overall communication network.

In a first possible implementation according to the first aspect, the communication network comprises one or more sub-networks and, in view of the one or more sub-networks, the indicator is an identifier of the provider of the industry vertical and/or of the service in a respective sub-network and the QoS parameter set comprises QoS parameters in the respective sub-network for the provider of the industry vertical and/or of the service.

In a second possible implementation form according to the first aspect as such or according to the first implementation form of the first aspect, the QoS parameter set is variable. The term "variable" means that the QoS parameter set is amendable and is not necessarily fixed. E.g., QoS parameters may be added to the QoS parameter set, may be amended in the QoS parameter set, and/or may be deleted from the QoS parameter set.

According to a second aspect, a quality of service, QoS, central controller is provided, wherein the QoS central controller is configured to manage QoS classes in a communication network by use of a QoS class indicator, QCI, structure, which is arranged as mentioned above and described in more detail below, wherein each QoS class is identified by a QCI that is arranged according to the QCI structure.

In a first possible implementation according to the second aspect, the QoS central controller is configured to execute at least one of the following: authorizing a provider of an industry vertical and/or of a service in the communication network; generating a new QoS class by generating at least one new QCI according to the QCI structure and adding the at least one new QCI to a QCI set managed by the QoS central controller; amending a QoS class by amending in the QCI set at least one QCI, which identifies the QoS class to be amended; deleting a QoS class by deleting in the QCI set at least one QCI, which identifies the QoS class to be deleted.

In a second possible implementation form according to the first implementation form of the second aspect, the QoS central controller is configured to generate the new QoS class by: receiving a new QoS class request of a provider of an industry vertical and/or of a service in the communication network for generating the new QoS class, wherein the new QoS class request indicates a requested new QoS parameter set, comprising QoS parameters for the new QoS class; and generating the new QoS class by generating at least one new QCI comprising an identifier of the provider of the industry vertical and/or of the service, which requests the generation of the new QoS class, and a new QoS parameter set for the provider of the industry vertical and/or of the service, which requests the generation of the new QoS class, wherein the new QoS parameter set is generated according to the requested new QoS parameter set.

In a third possible implementation form according to the first implementation form of the second aspect, the QoS central controller is configured to generate the new QoS class by executing the following: receiving a new QoS class request of a provider of an industry vertical and/or of a service in the communication network for generating the new QoS class, wherein the new QoS class request indicates a requested new QoS parameter set, comprising QoS parameters for the new QoS class; and for each sub-network of the one or more sub-networks of the communication network, performing the following: verifying the new QoS class request in view of policies allowed for the provider of the industry vertical and/or of the service in the respective sub-network and/or in the communication network; and, if the new QoS class request is allowable in view of the policies in the respective sub-network and/or in the communication network, verifying capabilities of the sub-network towards the provider of the industry vertical and/or of the service in the respective sub-network, and generating, for the respective sub-network, a corresponding new QCI for the provider of the industry vertical and/or of the service, which requests the generation of the new QoS class.

In a fourth possible implementation form according to the third implementation form of the second aspect, the corresponding new QCI comprises an identifier of the provider of the industry vertical and/or of the service, which requests the generation of the new QoS class, at the respective sub-network and a corresponding QoS parameter set in the respective sub-network for the provider of the industry vertical and/or of the service, which requests the generation of the new QoS class.

In a fifth possible implementation form according to the third implementation form of the second aspect or according to the fourth implementation form of the second aspect, the QoS central controller is configured to generate the corresponding QoS parameter set for the provider of the industry vertical and/or of the service, which requests the generation of the new QoS class, according to the network's/sub-network's capabilities towards the provider of the industry vertical and/or of the service in the respective sub-network and according to the requested new QoS parameter set.

In a sixth possible implementation form according to the second aspect as such or according to the any one of the above-mentioned implementation forms of the second aspect, receiving a QoS class amendment request of a provider of an industry vertical and/or of a class of service in the communication network for amending the QoS class, wherein the QoS class amendment request indicates a requested amended QoS parameter set, comprising QoS parameters for the QoS class to be amended; determining in the QCI set at least one QCI, which identifies the QoS class to be amended; and amending the QoS class by amending the at least one determined QCI according to the requested amended QoS parameter set.

In a seventh possible implementation form according to the second aspect as such or according to the any one of the above-mentioned first to fifth implementation forms of the second aspect, the QoS central controller is configured to amend the QoS class by executing the following: receiving a QoS class amendment request of a provider of an industry vertical and/or of a service in the communication network for amending the QoS class, wherein the QoS class amendment request indicates a requested amended QoS parameter set, comprising QoS parameters for the QoS class to be amended; and for each sub-network of the one or more sub-networks of the communication network, performing the following: determining in the QCI set a corresponding QCI, which identifies the QoS class to be amended for the respective sub-network; and verifying capabilities of the sub-network towards the provider of the industry vertical and/or of the service in the respective sub-network, and amending the QOS parameter set of the corresponding QCI according to the requested amended QoS parameter set and according to the capabilities of the sub-network towards the provider of the industry vertical and/or of the service in the respective sub-network.

In an eighth possible implementation form according to the second aspect as such or according to the any one of the above-mentioned implementation forms of the second aspect, the QoS central controller is configured to delete the QoS class by: receiving a QoS class deletion request of a provider of an industry vertical and/or of a service in the communication network for deleting the QoS class; determining in the QCI set at least one QCI, which identifies the provider of the industry vertical and/or of the service; and deleting the QoS class by deleting from the QCI set the determined at least one QCI.

In a ninth possible implementation form according to the second aspect as such or according to the any one of the above-mentioned first to seventh implementation forms of the second aspect, the QoS central controller is configured to delete the QoS class by executing the following: receiving a QoS class deletion request of a provider of an industry vertical and/or of a service in the communication network for deleting the QoS class; and for each sub-network of the one or more sub-networks of the communication network, performing the following: determining in the QCI set a corresponding QCI, which identifies the QoS class to be deleted for the respective sub-network; and deleting in the QCI set the determined corresponding QCI.

According to a third aspect, a quality of service, QoS, central control method is provided, wherein the QoS central control method comprises managing of QoS classes in a communication network by use of a QoS class indicator, QCI, structure, as introduced above and/or as explained in more detail below, wherein each QoS class is identified by a QCI that is arranged according to the QCI structure. Generally, the steps of the QoS central control method correspond to the steps or activities executed by the QoS central control device, as introduced above and/or as explained in more detail below.

According to a fourth aspect, a quality of service, QoS, sub-network controller is provided, wherein the QoS sub-network controller is arranged to configure devices in a sub-network of a communication network by use of QoS classes, identified by a QoS class indicator (QCI) as introduced above and/or as explained in more detail below.

In a first possible implementation form according to the fourth aspect as such, the QoS sub-network controller is arranged to configure the devices in the sub-network in response to a reception of a QoS class related request, wherein the QoS class related request is a request to add a new QoS class, to amend a QoS class, or to delete a QoS class.

In a second possible implementation form according to the fourth aspect as such or according to the first possible implementation form of the fourth aspect, the QoS sub-network controller is configured to receive the QoS class related request from a quality of service, QoS, central controller.

In a third possible implementation form according to the fourth aspect as such or according to the first or second possible implementation form of the fourth aspect, the sub-network is a core network or a radio access network.

In a fourth possible implementation form according to the fourth aspect as such or according to any one of the possible implementation forms of the fourth aspect, if the sub-network, in which the sub-network controller configures devices by use of QoS classes, is a Radio Access Network (RAN) or edge network, the QoS sub-network controller is configured to: generate a configuration information according to a QCI of a new or amended QoS class; and transmit the configuration information to one or more access points of the sub-network such that each one of the one or more access points of the sub-network is enabled to configure one or more user communication devices, connected to the respective access point, by use of the configuration information.

In the following, the terms "Radio Access Network" (i.e. "RAN") or "edge network" are used synonymously, wherein their meaning is generally known to the person skilled in the art.

According to a fifth aspect, a quality of service, QoS, sub-network control method is provided, wherein the QoS sub-network control method comprises configuring of devices in a sub-network of a communication network by use of QoS classes, identified by a QoS class indicator, QCI, that is arranged according to the QCI structure, as introduced above and/or as explained in more detail below.

Thus, devices and methods are provided that enable an improved handling of different data flows in a communication network according to different QoS classes.

According to the present disclosure, a new QCI structure is provided that is easy implementable and, furthermore, is a powerful instrument for managing QoS parameters of both industry verticals and services in the communication network and, thus, for handling and controlling a plenty of different data flows in the communication network. Additionally, the new QCI structure allows an easy and effective addition, deletion, and change of QCIs and, thus, of QoS classes. Hence, the introduction of new industry verticals and/or services and amendments concerning existing industry verticals and/or services in the communication network may be performed without comprehensive amendments of the structure of the communication network. A modular and re-configurable handling of industry verticals and/or services and, thus, of different data flows becomes possible. Additionally, the QCI structure, introduced herein, is not limited to a particular number of QCIs and is able to handle a plurality of different QCIs.

Moreover, the present disclosure allows to fulfill at least some of the following aspects: support network slicing for different verticals with network slices being introduced and torn down dynamically; facilitate QoS support for services within the slices of the verticals; take into consideration Allocation-Retention-Policy (ARP) management, load balancing across industries, access and core network capabilities etc.; and/or be compatible with the individual QoS capabilities of different access and core networks.

Furthermore, also the QoS central controller, the QoS sub-network controller, and the corresponding methods are provided, such that they lead to the above-mentioned improvements and advantages.

BRIEF DESCRIPTION OF DRAWINGS

The above-described aspects and implementation forms will be explained in the following description of specific embodiments in relation to the enclosed drawings, in which

FIG. 7 shows sub-steps executed for adding the new QoS class according to an embodiment of the present invention.

FIGS. 9a, 9b show generation of different sub-network specific QCIs for a requested new QoS class according to an embodiment of the present invention.

FIG. 12 shows sub-steps executed for amending the existing QoS class according to an embodiment of the present invention.

DETAILED DESCRIPTION OF EMBODIMENTS

Generally, it has to be noted that all arrangements, devices, modules, components, models, elements, units, entities, and means and so forth described in the present application could be implemented by software or hardware elements or any kind of combination thereof. All steps which are performed by the various entities described in the present application as well as the functionality described to be performed by the various entities are intended to mean that the respective entity is adapted to or configured to perform the respective steps and functionalities. Even if in the following description of the specific embodiments, a specific functionality or step to be performed by a general entity is not reflected in the description of a specific detailed element of the entity which performs the specific step or functionality, it should be clear for a skilled person that these methods and functionalities can be implemented in respective hardware or software elements, or any kind of combination thereof. Further, the method and its various steps are embodied in the functionalities of the various described apparatus elements.

Moreover, any of the embodiments and features of any of the embodiments, described herein, may be combined with each other, unless a combination is explicitly excluded.

Figure 1:
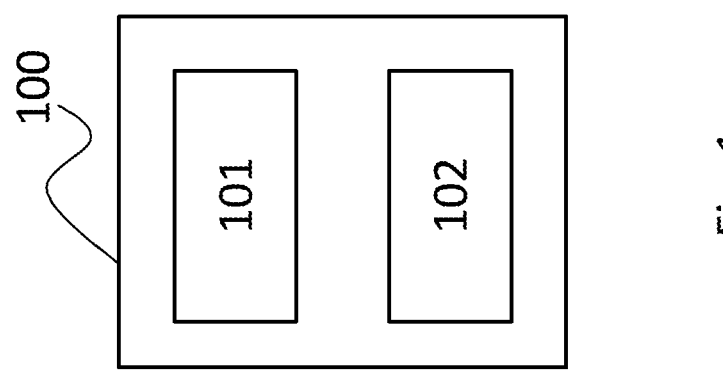
FIG. 1 shows an arrangement of a QCI structure according to an embodiment of the present invention.

FIG. 1 shows an arrangement of a QCI structure 100 according to an embodiment of the present invention. The QCI structure 100 is arranged to control communication in a communication network and to classify data flows in the communication network. According to the embodiment of FIG. 1, the QCI structure 100 comprises an identifier 101 of an industry vertical in the communication network or of a service provider in the communication network. Further, the QCI structure 100 comprises a QoS parameter set 102 of the industry vertical or of the service provider. The QoS parameter set 102 comprises parameters as already known with regard to conventional QCI. Such parameters comprise, for example, allocation and retention priority (ARP), guaranteed bit rate (GBR) for uplink and/or for downlink, maximum bit rate (MBR) allowed for uplink and/or for downlink, etc. Embodiments of the present invention are however not limited to the exemplary listed parameters and, in view of its modularity, QoS parameter set 102 is configured to comprise also further parameters besides or instead at least one of the exemplary listed parameters. In particular, according to the present embodiment the QoS parameter set 102 is configured as a variable set, i.e. the QoS parameter set 102 may be changed at any time by adding new parameters, by amending parameters in the QoS parameter set 102, and/or by deleting parameters in the QoS parameter set 102.

If the communication network comprises one or more sub-networks (e.g., one or more core networks and/or one or more RANs), the identifier 101 is an identifier of an industry vertical or of a service provider in a respective sub-network and the QoS parameter set 102 of the industry vertical or of the service provider comprises QoS parameters in the respective sub-network for the industry vertical or of the service provider.

Thus, according to the present embodiment, the QCI is no longer a simple index as the conventional QCI but represents rather a tuple, which, according to a further embodiment is represented, for example, as follows:

$$(V,S)=(V,<S\_1,S\_2,S\_3,\ldots,S\_m>)$$

where V represents the identifier 101 of the industry vertical or the service provider (e.g., vehicle-to-everything (V2X), mobile terminated call (MTC), etc.), and S is the QoS parameter set 102 with m parameters, wherein m is an integer that is greater than or equal one. According to an embodiment, the parameters of S or QoS parameter set 102, respectively, are set by the provider of the industry vertical and/or service in the communication network.

As mentioned, according to an embodiment, the QCIs are dynamically introduced into the system. This will be shown in more detail below.

Figure 2:
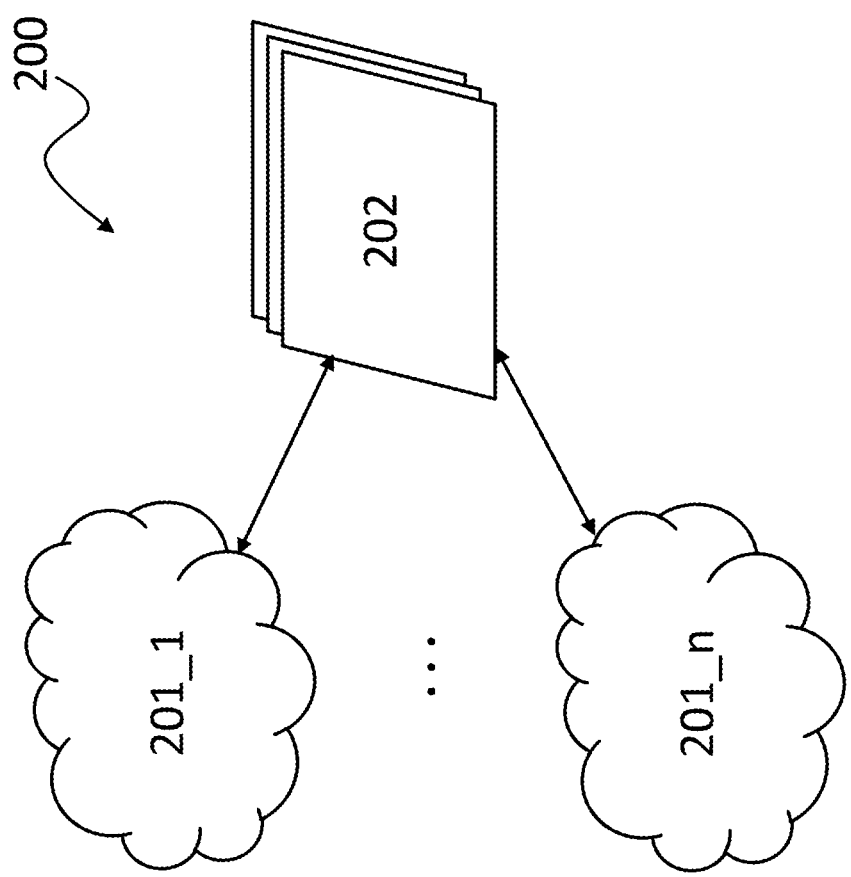
FIG. 2 shows an exemplary arrangement of a communication network, in which the present invention is implementable according to an embodiment of the present invention.

FIG. 2 shows an exemplary arrangement of a communication network 200 according to an embodiment of the present invention. The communication network 200 comprises as sub-networks one or more RANs 201_1, . . . , 201_n, wherein n is an integer that is greater than or equal to one. Further, the communication network 200 comprises as sub-networks one or more core networks 202. For sake if simplicity, only one core network 202 is shown exemplary in FIG. 2. As generally known from conventional arrangements, each RAN 201_1, . . . , 201_n of the one or more RANs 201_1, . . . , 201_n resides between at least one communication device (i.e., a user communication device such as a mobile phone, a computer, actuator, sensor or any other device configured to communicate via the communication network 200), wherein the communication device is not shown in FIG. 2, and provides connection with its core network 202. The connection and communication between the one or more RANs 201_1, . . . , 201_n and the respective core network 202 are shown in FIG. 2 by the arrows between the one or more RANs 201_1, . . . , 201_n and the respective core network 202.

Figure 3:
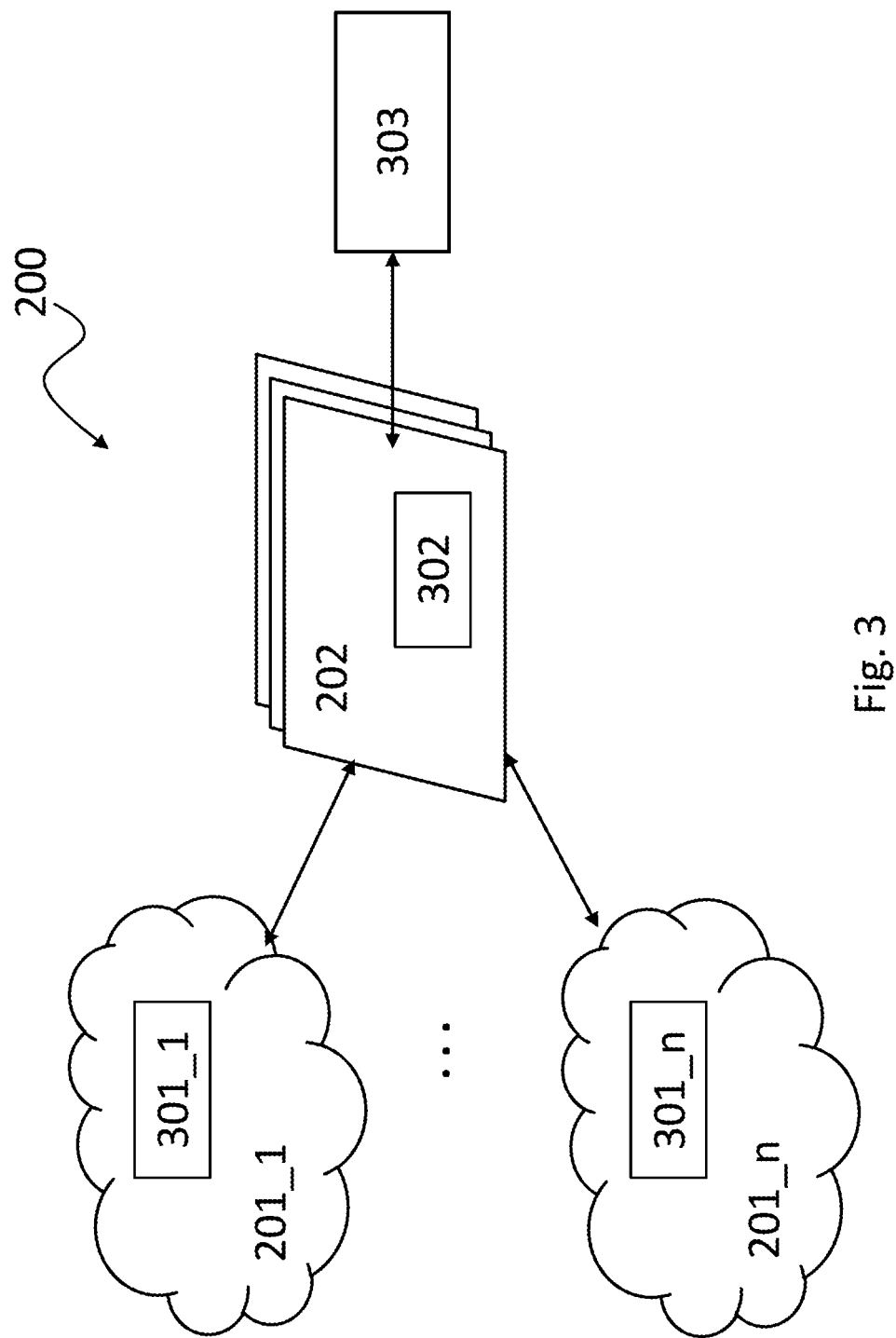
FIG. 3 shows an exemplary arrangement of QoS controller devices in the communication network according to an embodiment of the present invention.

FIG. 3 shows an exemplary arrangement of QoS controller devices 301_1, . . . 301_n, 302, 303 in the communication network 200 according to an embodiment of the present invention. According to the embodiment of FIG. 3, each sub-network 201_1, . . . , 201_n, 202 comprises a respective QoS sub-network controller 301_1, . . . 301_n, 302. Each one of the one or more RANs 201_1, . . . , 201_n comprises a QoS RAN or edge controller 301_1, . . . 301_n, and each one of the one or more core networks 202 comprises a core controller 302. Here, it has to be mentioned that each one of the sub-networks 201_1, . . . , 201_n, 202 is arranged such that it comprises one or more respective QoS sub-network controllers 301_1, . . . 301_n, 302. For sake of simplicity, only one QoS sub-network controller 301_1, . . . 301_n, 302 per sub-network 201_1, . . . , 201_n, 202 is shown in FIG. 3.

Additionally, a QoS central controller 303 is provided in the communication network 200 according to the embodiment of FIG. 3, wherein the QoS central controller 303 is configured to execute the management of the QoS classes and, thus, of the QCIs in the whole communication network 200. Each one of the QoS sub-network controllers 301_1, . . . 301_n, 302 is configured to execute the management of the QoS classes and, thus, of the QCIs in the respective sub-network 201_1, . . . , 201_n, 202 of the communication network 200.

A provider of a service and/or of a vertical industry in the communication network 200 has an interface for communicating with the QoS central controller 303. Via the communication with the QoS central controller 303, the provider of a service and/or of a vertical industry is enabled to add new QoS classes and, thus, new QCIs, to amend existing QoS classes and, thus, existing QCIs, and/or to delete existing QoS classes and, thus, existing QCIs.

When a QoS class and, thus, a respective QCI is manipulated (added, amended, deleted) by the provider of the industry vertical and/or service, the framework of the QoS controllers 301_1, . . . 301_n, 302, 303 automatically negotiates and configures the QoS parameters in the communication network 202 and its sub-networks 201_1, . . . , 201_n, 202 and thereby correspondingly incorporates the respective QCI in the communication network 200.

Generally, the QoS central controller 303 is the primary logical component of the QoS controller 301_1, . . . 301_n, 302, 303 framework. It exposes an application programming interface (API) into the QoS controller 301_1, . . . 301_n, 302, 303 system that can be used by the providers of industry verticals and/or service to perform addition, amendment and/or deletion operations on quality indicator. When an addition, amendment and/or deletion operation is performed on a QCI, the QoS central controller 303 is responsible for: authorizing the operation by verifying the operation with Service Level Agreements (SLAs) or Policy Control Enforcement Function (PCEF) before the respective operation can be incorporated into the communication network; negotiating and deriving corresponding QoS classes for each one of the core and edge (i.e. RAN) network components that are involved in providing the service or industry vertical facilitated by the QCI; maintaining a record of the core and edge QoS classes for a given QCI.

The QoS core controller 302 is generally responsible for informing the QoS central controller 303 on available QoS capabilities of its core network 202 upon request. Further, the QoS core controller 302 is responsible for configuration of its core network 202 for supporting the QoS class parameters received from QoS central controller 303. The configuration of the core network 202 comprises, for example, adding, amending, and/or deleting traffic classifiers and packet marking policies in the respective core network 202. The traffic classifiers and packet marking policies comprise, for example, traffic flow templates (TFTs) in the case bearer based systems and/or packet filters at the entry nodes in case of bearer less systems. The configuration of the core network 202 comprises, for example, adding, changing, and/or deleting of QoS policy enforcements in the core nodes (e.g., ARP, differentiated services (diffServ) etc.). Further, the QoS core controller 302 is generally responsible for maintaining records of the QoS classes and, thus, of QCIs in the corresponding core network 202.

Each QoS RAN or edge controller 301_1, . . . 301_n is in general responsible for informing the QoS central controller 303 of the available QoS capabilities of the corresponding RAN 201_1, . . . 201_n upon request. Further, each QoS edge controller 301_1, . . . 301_n is adapted to configure the nodes (e.g., eNBs) in the respective RAN for supporting the QoS class parameters received from QoS central controller 303. The configuring of the nodes in the RAN comprises, for example, adding, amending, and/or deleting of traffic classifiers and packet marking policies in the RAN nodes (e.g., eNBs). The traffic classifiers and packet marking policies comprise, for example, TFTs in the case bearer based systems and packet filters at the RAN nodes in case of bearer less systems. Further, the configuring of the nodes in the RAN comprises, for example, adding, changing, and/or deleting of QoS policy enforcements in the RAN nodes (e.g. ARP, diffServ etc.). Additionally, each QoS RAN or edge controller 301_1, . . . 301_n is in general responsible for maintaining records of the QoS classes and, thus, of the QCIs in the corresponding RAN 201_1, . . . 201_n.

Figure 4C:
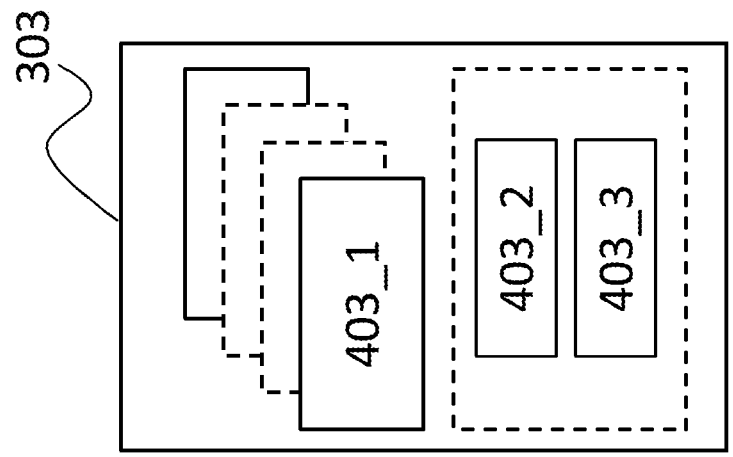
FIG. 4c shows an exemplary arrangement of the QoS central controller according to an embodiment of the present invention.
Figure 4B:
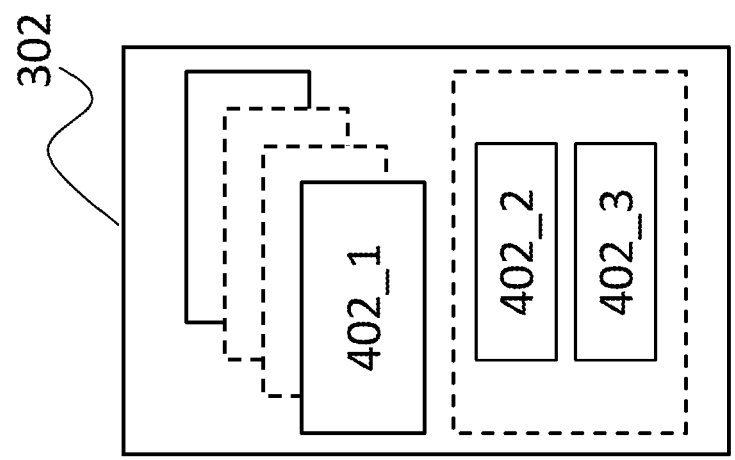
FIG. 4b shows an exemplary arrangement of the QoS core controller according to an embodiment of the present invention.
Figure 4A:
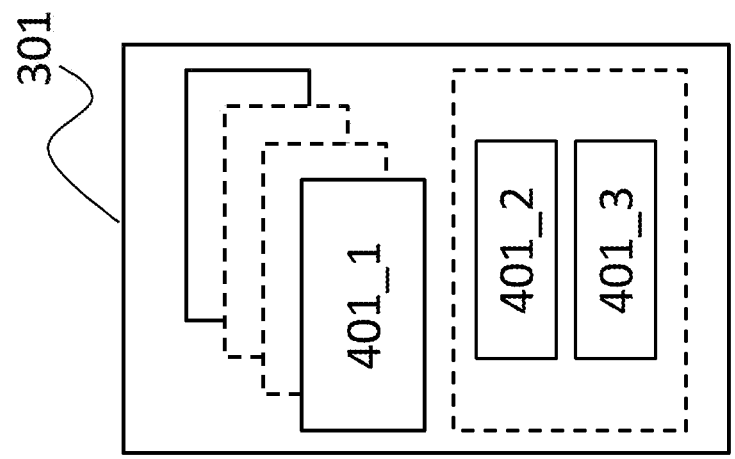
FIG. 4a shows an exemplary arrangement of the QoS edge controller according to an embodiment of the present invention.

FIG. 4a shows an exemplary arrangement of the QoS edge or RAN controller 301 according to an embodiment of the present invention. The QoS edge or RAN controller 301 is a representative of any one of the QoS edge or RAN controllers 301_1, . . . 301_n shown in FIG. 3.

According to the present embodiment, the QoS edge controller 301 comprises a transmitting entity 401_2, configured to execute transmission of data in the communication network 200, and a receiving entity 401_3, configured to execute reception of data in the communication network 200. According to an embodiment, the transmitting entity 401_2 and the receiving entity 401_3 are provided as one entity (e.g., transceiver), as indicated in FIG. 4a by the box with dashed lines. Thus, any one of the transmission steps, which is described herein as being executed by the QoS edge controller 301, 301_1, . . . 301_n, is executed by the transmitting entity 401_2. Any one of the reception steps, which is described herein as being executed by the QoS edge controller 301, 301_1, . . . 301_n, is executed by the receiving entity 401_3.

Further, the QoS edge controller 301 comprises one or more processing entities 401_1 configured to execute different processing steps, except for the transmission and reception of data, which are executed accordingly by the transmitting entity 401_2 and the receiving entity 401_3. Thus, any one of the steps, which is described herein as being executed by the QoS edge controller 301, 301_1, . . . 301_n and which does not refer to data transmission or reception, is executed by at least one of the one or more processing entities 401_1.

FIG. 4b shows an exemplary arrangement of the QoS core controller 302 according to an embodiment of the present invention. According to the present embodiment, the QoS core controller 302 comprises a transmitting entity 402_2, configured to execute transmission of data in the communication network 200, and a receiving entity 402_3, configured to execute reception of data in the communication network 200. According to an embodiment, the transmitting entity 402_2 and the receiving entity 402_3 are provided as one entity (e.g., transceiver), as indicated in FIG. 4b by the box with dashed lines. Thus, any one of the transmission steps, which is described herein as being executed by the QoS core controller 302, is executed by the transmitting entity 402_2. Any one of the reception steps, which is described herein as being executed by the QoS core controller 302, is executed by the receiving entity 402_3.

Further, the QoS core controller 302 comprises one or more processing entities 402_1 configured to execute different processing steps, except for the transmission and reception of data, which are executed accordingly by the transmitting entity 402_2 and the receiving entity 402_3. Thus, any one of the steps, which is described herein as being executed by the QoS core controller 302 and which does not refer to data transmission or reception, is executed by at least one of the one or more processing entities 402_1.

FIG. 4c shows an exemplary arrangement of the QoS central controller 303 according to an embodiment of the present invention. According to the present embodiment, the QoS central controller 303 comprises a transmitting entity 403_2, configured to execute transmission of data in the communication network 200, and a receiving entity 403_3, configured to execute reception of data in the communication network 200. According to an embodiment, the transmitting entity 403_2 and the receiving entity 403_3 are provided as one entity (e.g., transceiver), as indicated in FIG. 4c by the box with dashed lines. Thus, any one of the transmission steps, which is described herein as being executed by the QoS central controller 303, is executed by the transmitting entity 403_2. Any one of the reception steps, which is described herein as being executed by the QoS central controller 303, is executed by the receiving entity 403_3.

Further, the QoS central controller 303 comprises one or more processing entities 403_1 configured to execute different processing steps, except for the transmission and reception of data, which are executed accordingly by the transmitting entity 403_2 and the receiving entity 403_3. Thus, any one of the steps, which is described herein as being executed by the QoS central controller 303 and which does not refer to data transmission or reception, is executed by at least one of the one or more processing entities 403_1.

Figure 5:
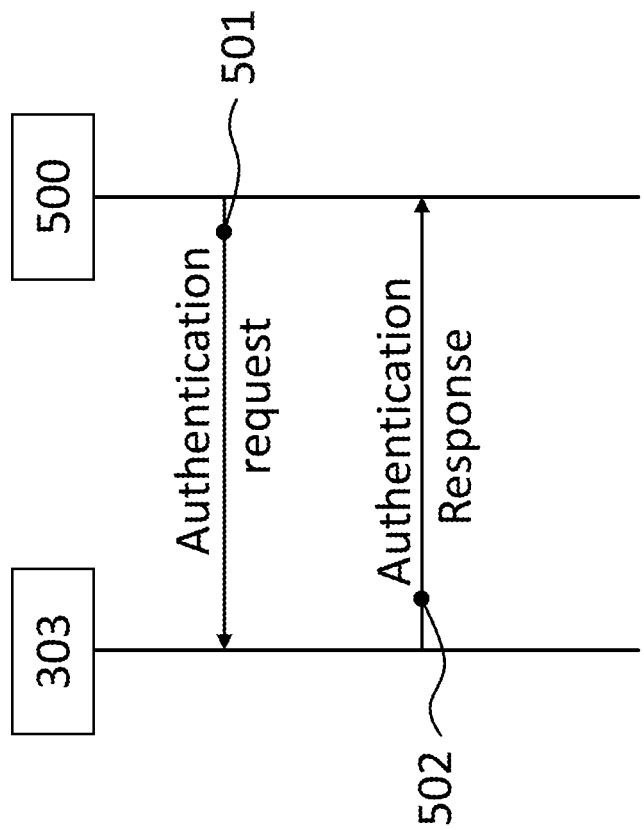
FIG. 5 shows steps executed for authenticating a provider of an industry vertical and/or of a service according to an embodiment of the present invention.

FIG. 5 shows steps executed for authenticating a provider 500 of an industry vertical and/or of a service according to an embodiment of the present invention.

According to the present embodiment, a provider 500 of an industry vertical and/or of a service initially gets authorized to access the QoS controller 301_1, . . . , 301_n, 302, 303 framework. According to the present embodiment the authorization is executed via the QoS central controller 303. In step 501, an authentication request (e.g., a "QoS CE CTRL Authentication Request" message) is sent by the provider 500 of an industry vertical and/or of a service to the QoS central controller 303. In response to the authentication request, the QoS central controller 303 responds in step 502 by transmitting to the provider 500 of an industry vertical and/or of a service a corresponding authentication response. The authentication response comprises an indication whether the authentication succeeded or failed. For example, if the authentication succeeds, the QoS central controller 303 transmits 502 to the provider 500 of an industry vertical and/or of a service an authentication success response (e.g., a "QoS CE CTRL Authentication Response Success" message) indicating that the authentication succeeded; and, if the authentication fails, the QoS central controller 303 transmits 502 to the provider 500 of an industry vertical and/or of a service an authentication success response (e.g., a "QoS CE CTRL Authentication Response Fail" message) indicating that the authentication failed.

Figure 6:
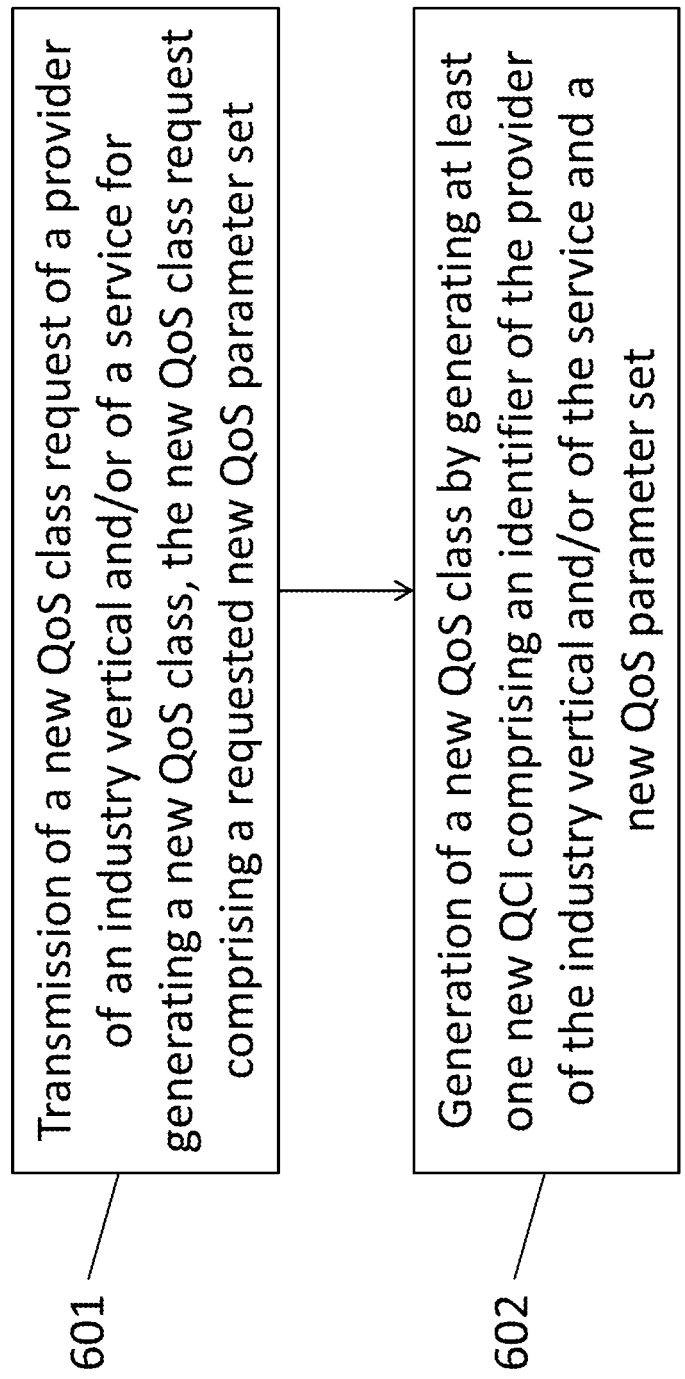
FIG. 6 shows steps executed for adding a new QoS class according to an embodiment of the present invention.

FIG. 6 shows steps executed for adding a new QoS class according to an embodiment of the present invention. In order to add a new QoS class, a transmission of a new QoS class request of a provider 500 of an industry vertical and/or of a service for generating a new QoS class is executed in step 601. The new QoS class request comprises a requested new QoS parameter set comprising one or more QoS parameters. In particular, the provider 500 of the industry vertical and/or of the service transmits 601 the new QoS class request to the QoS central controller 303. The QoS central controller 303 receives 601 the new QoS class request. Because the new QoS class request is a request of a particular provider 500 of an industry vertical and/or of a service, the new QoS class request indicates also the identifier of the provider 500 of the industry vertical and/or of the service of the QoS class or QCI, respectively, to be added.

In step 602, a new QoS class is generated by generating at least one new QCI. The at least one new QCI is generated according to the QCI structure. Thus, the at least one new QCI comprises an identifier 101 of the provider 500 of the industry vertical and/or of the service, which transmitted 601 the request for generating a new QoS class, and a new QoS parameter set 102 for the provider 500 of the industry vertical and/or of the service.

FIG. 7 shows sub-steps executed for adding the new QoS class according to an embodiment of the present invention. In particular, FIG. 7 shows sub-steps of the above-described step 602, in which the new QoS class is generated. Thus, the embodiment of FIG. 7 supplements the embodiment of FIG. 6 such that step 602 comprises steps of FIG. 7 as its sub-steps. The steps of FIG. 7 are executed, in general, by the QoS central controller 303 (e.g., by the one or more processing entities 403_1 of the QoS central controller 303). However, as shown below, also the one or more QoS core controllers 302 and the one or more QoS edge controllers 301_1, . . . , 301_n are arranged to support the execution of the steps of FIG. 7.

If the communication network 200 comprises sub-networks (e.g., one or more RANs 201_1, . . . , 201_n, and/or one or more core networks 202), the steps of FIG. 7 are executed with regard to each one of the sub-networks of the communication network 200.

In step 701, policies allowed for the provider 500 of the industry vertical and/or service in the communication network 200 and/or in the respective sub-network 201_1, . . . , 201_n, 202 are verified. If the new QoS class request is not allowable 702 in view of the policies in the communication network 200 and/or in the respective sub-network 201_1, . . . , 201_n, 202, the requested addition of the new QoS class is terminated in step 703. If the new QoS class request is allowable 702 in view of the policies in the communication network 200 and/or in the respective sub-network 201_1, . . . , 201_n, 202, capabilities towards the provider 500 of the industry vertical and/or of the service in the communication network 200 and/or in the respective sub-network 201_1, . . . , 201_n, 202 are verified in step 704. In step 705, a corresponding new QCI is generated for the communication network and/or for the respective sub-network 201_1, . . . , 201_n, 202. The generation 705 of the new QCI is executed according to the capabilities, verified in step 704, and according to the requested new QoS parameter set. Here, the new QoS parameter set 102 for the new QCI is intended at first to comprise the QoS parameters of the requested new QoS parameter set. However, in view of the verified 704 capabilities, the QoS parameters, as requested in the requested new QoS parameter set, are adjusted (e.g., amended and/or deleted). Thus, the new QoS parameter set 102 of the new QCI does not necessarily comprise all QoS parameters of the requested new QoS parameter set, it may comprise QoS parameters of the requested new QoS parameter set adjusted in view of the verified 704 capabilities. As mentioned above, the new QCI comprises further the identifier 101 of the provider 500 of the industry vertical and/or of the service.

Figure 8A:
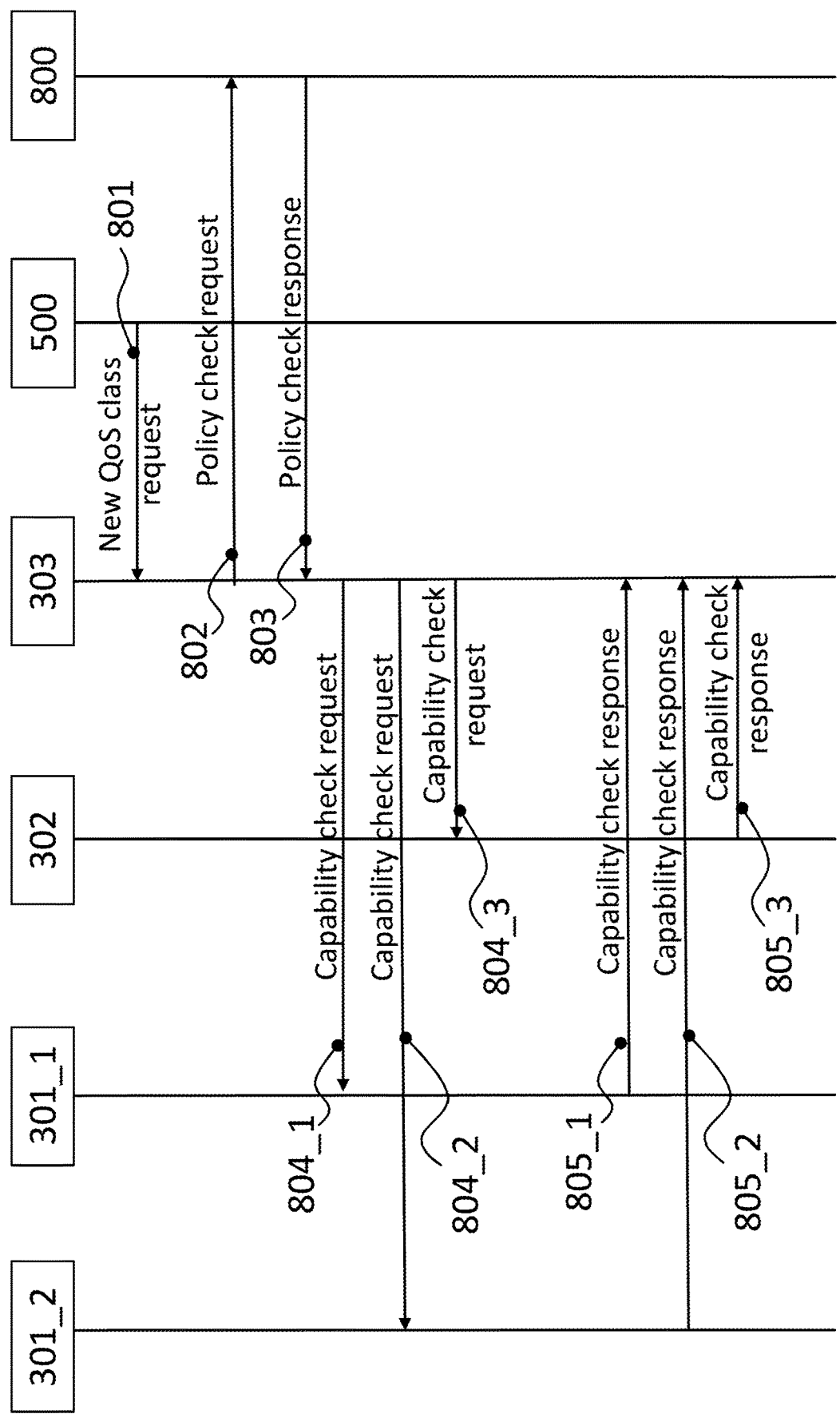
FIGS. 8a, 8b, 8c show steps executed for adding a new QoS class according to an embodiment of the present invention.
Figure 8B:
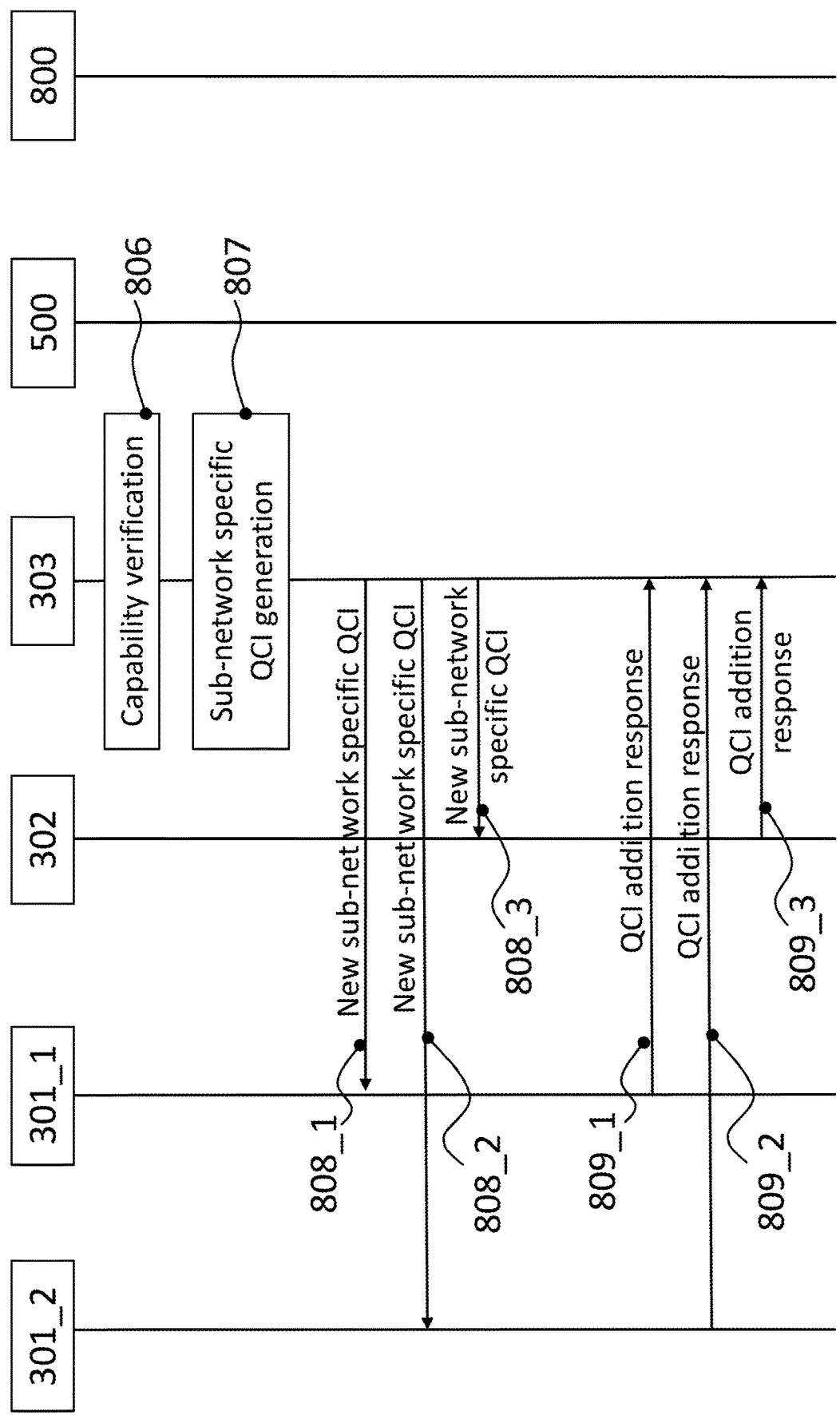
Figure 8C:
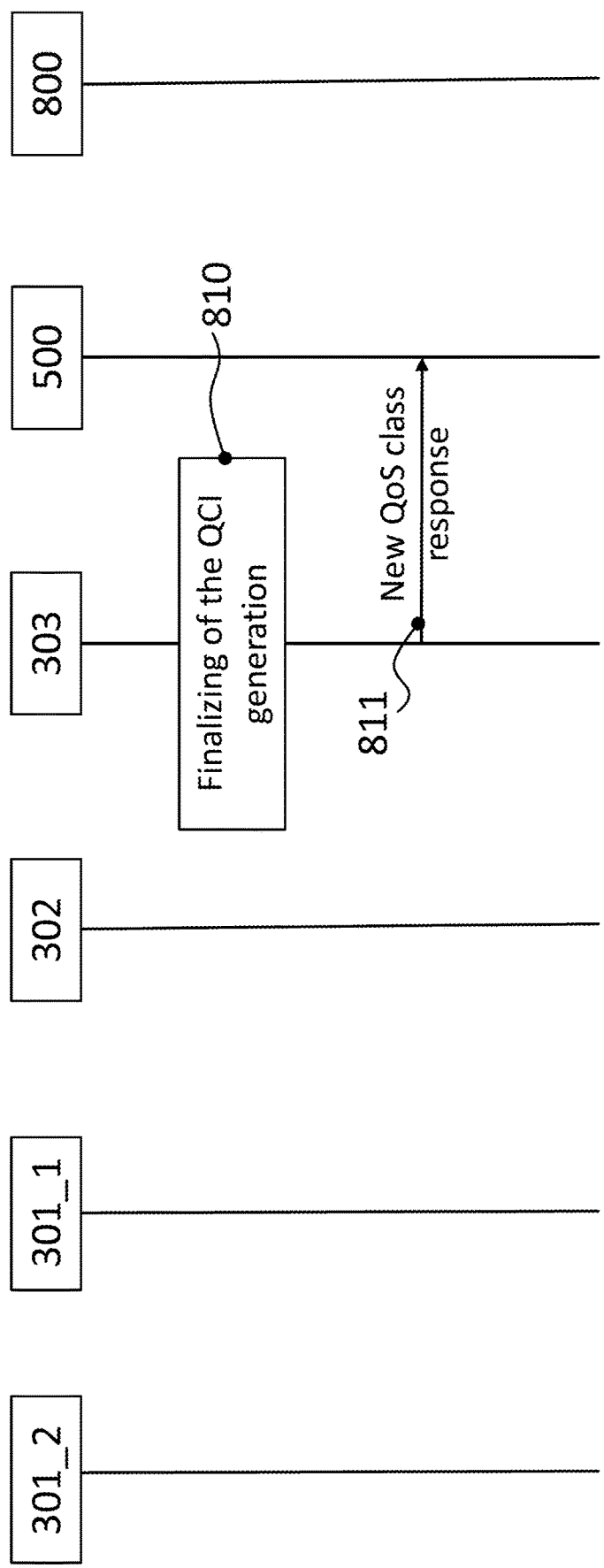

FIGS. 8a, 8b, 8c show steps executed for adding a new QoS class according to an embodiment of the present invention. The embodiment of FIGS. 8a, 8b, and 8c represents a more concrete specification of the embodiments of FIGS. 6 and 7. Thus, it is possible to incorporate accordingly into the embodiments of FIGS. 6 and 7 one or more of steps described with regard to FIGS. 8a, 8b, 8c.

According to the embodiment of FIGS. 8a, 8b, and 8c, in order to add a new QoS class, a provider 500 of an industry vertical and/or of a service, which desires the addition of the new QoS class, transmits 801 a new QoS class request to the QoS central controller 303. The new QoS class request is, for example, a message "QoS CE CTRL Policy ADD: S_1, S_2, . . . , S_N", where S_1, S_2, . . . , S_N are requested new QoS parameters for the QoS class to be added or of the QCI to be added, respectively, and where N is an integer that is equal to or greater than one. The QoS central controller 303 first checks this new QoS class request against the allowed policies for the provider 500 of the industry vertical and/or the service (see step 701 of FIG. 7) in the communication network 200 and/or in one or more sub-networks 201_1, . . . , 201_n, 202. The policies are set, for example, in a service level agreement (SLA) entity, in a policy and charging enforcement function (PCEF) entity, in a policy and charging rules function (PCRF) entity, or in another entity configured to set policies for the provider 500 in the communication network 200 and/or in one or more sub-networks 201_1, . . . , 201_n, 202. In the following, this entity is marked by the reference number 800 and referred to as policy setting entity. For verifying the policies, the QoS central controller 303 transmits 802 a policy check request to the policy setting entity 800. The policy check request is, for example, a "QoS CE CTRL Policy Check: (V_a, S_1, S_2, . . . , S_N)" message, where V_a represents an identifier of the provider 500 of the industry vertical and/or of the service. The policy setting entity 800 checks then the requested new QoS class (in particular the requested new QoS parameters (e.g., S_1, S_2, . . . , S_N)) against the allowed ones specified in the records of the policy setting entity 800. Subsequently, the policy setting entity 800 transmits 803 a policy check response to the QoS central controller 303. The policy check response indicates, whether the addition of the requested new QoS class is allowable or not in view of the existing policies. For example, the policy check response is a "QoS Policy PCEF Check Pass" message if the addition of the requested new QoS class is allowed, and the policy check response is a "QoS Policy PCEF Check Fail" message if the addition of the requested new QoS class is not allowed. If the addition of the requested new QoS class policy is not allowed, the QoS central controller 303 turns directly to step 811 and transmits 811 a new QoS class response to the provider 500 of the industry vertical and/or of the service, wherein the new QoS class response indicates that the addition of the requested new QoS class failed in view of the policies allowed for the provider 500 in the communication network 200 and/or in one or more sub-networks 201_1, . . . , 201_n, 202. In this case, the new QoS class response is, for example, a "QoS CE CTRL Policy ADD Fail" message.

In case the addition of the requested new QoS class is allowed in view of the policies, the QoS central controller 303 verifies capabilities of the sub-networks towards the provider 500 of the industry vertical and/or of the service (see step 704 of FIG. 7). For this purpose, the QoS central controller 303 requests each QoS sub-network controller 301, 301_1, . . . , 301_n, 202 for its capabilities towards the provider 500 of the industry vertical and/or of the service. In FIGS. 8a to 8c, the QoS edge controllers 301, 301_1, . . . , 301n, are represented exemplary by two QoS edge controllers 301_1, 301_2, wherein also one or more than two QoS edge controllers 301, 301_1, . . . , 301n are possible too. Further, only one QoS core controller 302 is shown exemplary in FIGS. 8a to 8c, wherein also more than one QoS core controllers 302 are possible too. Thus, as shown exemplary in FIGS. 8a to 8c, the QoS central controller 303 transmits 804_1, 804_2, 804_3 a corresponding capability check request for its capabilities towards the provider 500 of the industry vertical and/or service. The capability check request is, for example, a "QoS CE CTRL Edge Capability Request: V_a" message, where V_a represents an index of the provider 500 of the industry vertical and/or of the service, if the capability check request is sent 804_1, 804_2 to a QoS edge controller 301_1, 301_2. The capability check request is, for example, a "QoS CE CTRL Core Capability Request: V_a" message if the capability check request is sent 804_3 to the QoS core controller 302.

Each one of the QoS edge controller(s) 301_1, 301_2 and the QoS core controller(s) 302 responds then by transmitting 805_1, 805_2, 805_3 to the QoS central controller 303 a corresponding capability check response indicating the respective capabilities of the respective QoS edge controller 301_1, 301_2 or QoS core controller. An QoS edge controller 301_1, 301_2 transmits 805_1, 805_2, for example, to the QoS central controller 303 a "QoS ED CTRL Capability Response" message as the capability check response comprising capabilities, which the QoS edge controller 301_1, 301_2 can offer for the provider 500 of the industry vertical and/or of the service, the provider 500 having the identifier V_a. Similarly, a QoS core controller 302 transmits 805_3, for example, to the QoS central controller 303 a "QoS CO CTRL Capability Response" message as the capability check response comprising capabilities, which the QoS core controller 302 can offer for the provider 500 of the industry vertical and/or of the service, the provider 500 having the identifier V_a.

In response to the reception 805_1, 805_2, 805_3 of the capability check responses, the QoS central controller 303 executes a capability verification in step 806 (see also step 704 of FIG. 7). Based on the capability verification 806 and based on the capability check responses, the QoS central controller 303 computes individual edge and core QoS classes or individual QCIs (see also step 705 of FIG. 7).

In view of the differences of the capabilities of the provider 500 of the industry vertical and/or service in the sub-networks 201_1, . . . , 201_n, 202 of the communication network 200, different QCIs are generated 807 with regard to the requested new QCI class. For each one of the sub-networks 201_1, . . . , 201_n, 202, a corresponding QCI is generated 807. This is shown exemplary in FIGS. 9a and 9b.

Figure 9A:
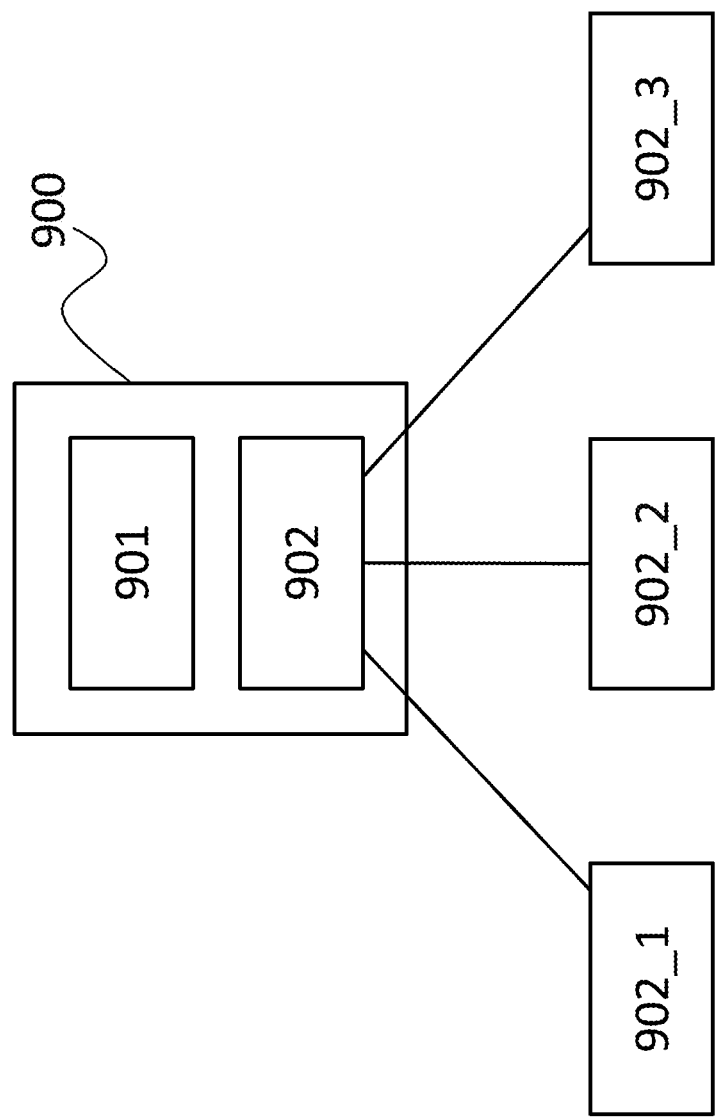

FIGS. 9a, 9b show generation 807 of different sub-network specific QCIs for a requested new QoS class according to an embodiment of the present invention.

FIG. 9a shows in the upper part a QCI 900 that is arranged according to the QCI structure 100 of FIG. 1 and comprises the identifier 901 (i.e. the above-mentioned V_a) of the provider 500 of the industry vertical and/or of the service and a requested new QoS parameter set 902 (i.e., the above mentioned set S_1, S 2, . . . , S_N) requested 801 by the provider 500 of the industry vertical and/or of the service for the generation of the new QoS class. In view of the different capabilities of the provider 500 of the industry vertical and/or service in the sub-networks 201_1, . . . , 201_n, 202 of the communication network 200, for each sub-network 201_1, . . . , 201_n, 202 a corresponding individual new QoS parameter set 902_1, 902_2, 902_3 is generated. FIG. 9a refers to the embodiment of FIGS. 8a to 8c, therefore, a new QoS parameter set 902_1 for the RAN 201_1, . . . , 201_n of the QoS edge controller 301_1 is generated, a new QoS parameter set 902_2 for the RAN 201_1, . . . , 201_n of the QoS edge controller 301_2 is generated, and a new QoS parameter set 902_3 for the core network 202 of the QoS core controller 302 is generated. Each one of the sub-network specific new QoS parameter sets 902_1, 902_2, 902_3 is initially based on the requested new QoS parameter set 902 and has been adapted in view of the capabilities of the provider 500 of the industry vertical and/or of the service in the respective sub-network 201_1, . . . , 201_n, 202. The adaptation comprises addition of another QoS parameters, deletion of the QoS parameters of the requested new QoS parameter set 902, and/or amending of the QoS parameters of the requested new QoS parameter set 902.

Finally, as shown in FIG. 9b, sub-network specific QCIs 900_1, 900_2, 900_3 are generated based on the requested QCI 900, requested 801 by the provider 500 of the industry vertical and/or of the service in the new QoS class request. Because the embodiment of FIG. 9b exemplary refers to the embodiment of FIGS. 8a to 8c, the QCI 900_1 is a QCI generated for the RAN 201_1, . . . , 201_n of the QoS edge controller 301_1, the QCI 900_2 is a QCI generated for the RAN 201_1, . . . , 201_n of the QoS edge controller 301_2, and the QCI 900_3 is a QCI generated for the core network 202 of the QoS core controller 302. Each one of the sub-network specific QCIs 900_1, 900_2, 900_3 refers to the same provider 500 of the industry vertical and/or of the service, as indicated by the identifier 901 in the sub-network specific QCIs 900_1, 900_2, 900_3.

The storage of the QCIs 900, 900_1, 900_2, 900_3 in the communication network 200 is executed according to an embodiment as explained in the following. Let (V_a, S_1, S_2, . . . , S_N) be the new QoS class as requested 601, 801, where V_a is the identifier 901 of the provider 500 of the industry vertical and/or of the service, and S_1, S_2, . . . , S_N are the QoS parameters of the requested new QoS parameter set 902. Further, let assume that the industry vertical and/or the service of the provider 500 involves communication traversing through a chain of x edge or RAN networks 201_1, . . . , 201_n and y core networks 202, where x>0 and y>0 but not x=0 and y=0 at the same time.

Then, at each one of the QoS edge controller ED_i (see also 301, 301_1, 301_2, . . . , 301_n) where i is an integer being equal to or greater than one and being equal to or less than x (i.e., i=1, 2, . . . , x) a RAN or edge QoS class or QCI, respectively, (see QCIs 900_1, 900_2) corresponding to (V_a, S_1, S_2, . . . , S_N) (see QCI 900) will exist in its records and the nodes in that RAN are configured by the QoS edge controller ED_i to support that RAN, edge QoS class or QCI respectively. The record of the QoS class or QCI, respectively, of the RAN at the QoS edge controller ED_i could look like:

<a local index or ID at ED_i> (R_(i,1), R_(i,2), . . . , R_(i,ED_i))

where (R_(i,1), R_(i,2), . . . , R_(i,ED_i)) is the set of QoS parameters (see 902_1, 902_2) in the corresponding RAN of the QoS edge controller ED_i.

At each one of the QoS core controller CR_j (see also the QoS core controller 302), where j is an integer being equal to or greater than one and being equal to or less than x (i.e. j=1, 2, . . . , y) a core QoS class or QCI, respectively, (see QCI 900_3) corresponding to (V_a, S_1, S_2, . . . , S_N) (see QCI 900) will exist in its records and the nodes in that core network 202 are configured by the QoS core controller CR_j to support that core QoS class or QCI respectively. The record of the core QoS class at the QoS core controller CR_j could look like:

<a local index or ID at CR_j> (C_(j,1), C_(j,2), . . . , C_(j,CR_j))

where (C_(j,1), C_(j,2), . . . , C_(j,CR_j)) is the is the set of QoS parameters (see 902_3) in the corresponding core sub-network of the QoS core controller CR_j.

At the QoS central controller CE (see also QoS central controller 303), a record of indices of QoS classes at different QoS core controllers 302 and at different QoS edge or RAN controllers 301, 301_1, 301_2, . . . , 301_n corresponding to the (V_a, S_1, S_2, . . . , S_N) (see also QCI 900) will exist which could look like:

| | (V_a, S_1, S_2, . . . , S_N) |
|---|---|
| ED_1 | <a local index or ID at ED_1 for (R_(i, 1), R_(i, 2), . . . , R_(i, ED_1))> |
| ED_2 | <a local index or ID at ED_2 for (R_(i, 1), R_(i, 2), . . . , R_(i, ED_2))> |
| . . . | . . . |
| . . . | . . . |
| ED_x | <a local index or ID at ED_x for (R_(i, 1), R_(i, 2), . . . , R_(i, ED_x))> |
| CR_1 | <a local index or ID at CR_1 for (C_(j, 1), C_(j, 2), . . . , C_(j, CR_1))> |
| CR_2 | <a local index or ID at CR_2 for (C_(j, 1), C_(j, 2), . . . , C_(j, CR_2))> |
| . . . | . . . |
| . . . | . . . |
| CR_y | <a local index or ID at CR_y for (C_(j, 1), C_(j, 2), . . . , C_(j, CR_y))> |

Thus, while at the QoS central controller 303, a global QCI 900 as requested 601, 901 for addition, for example, and the corresponding the sub-network 201_1, . . . , 201_n, 202 specific QCIs 900_1, 900_2, 900_3 are stored. At each one of the QoS sub-network controllers 301, 301_1, 301_2, . . . , 301_n, 302 only the respective sub-network 201_1, . . . , 201_n, 202 specific QCI 900_1, 900_2, 900_3 is stored, wherein the global identifier 901 may be replaced in each one of the sub-network 201_1, . . . , 201_n, 202 specific QCIs 900_1, 900_2, 900_3 by a corresponding local identifier of the provider 500 of the industry vertical and/or service in the respective sub-network 201_1, . . . , 201_n, 202.

When turning back to the embodiment of FIGS. 8a to 8c, once the sub-network specific QCIs 900_1, 900_2, 900_3 have been generated 807, the QoS central controller 303 transmits 808_1, 808_2, 808_3 to each one of the QoS sub-network controllers 301_1, 301_2, 302 the respective sub-network specific QCI 900_1, 900_2, 900_3 generated 807 for the QoS sub-network controller 301_1, 301_2, 302.

For example, a new RAN or edge specific QCI 301_1, 301_2 is transmitted 808_1, 808_2 to a QoS edge controller 301_1, 301_2 via a "QoS CE CTRL ADD: V_a, (R_(i,1), R_(i,2), . . . , R_(i,ED_i))" message, wherein ED_i indicates the receiving QoS edge controller 301_1, 301_2, (R_(i,1), R_(i,2), . . . , R_(i,ED_i)) indicates the QoS parameter set 902_1, 902_2 for the receiving QoS edge controller 301_1, 301_2, and V_a represents the identifier 901 of the provider 500 of the industry vertical and/or service. Each one of the QoS edge controllers 301_1, 301_2 receives 808_1, 808_2 the respective RAN specific QCI 900_1, 900_2 and ads it to its QCI records. Subsequently, each one of the QoS edge controllers 301_1, 301_2 transmits 809_1, 809_2 a respective QCI addition response. The QCI addition response indicates whether the addition of the respective RAN specific QCI 900_1, 900_2 succeeded or failed. If the addition succeeds, the QCI addition response is, for example, a "QoS ED CTRL ADD Success: <a local index or ID at ED_i>" message. If the addition fails, the QCI addition response is, for example, a "QoS ED CTRL ADD Fail" message.

Similarly, new core specific QCI 301_3 is transmitted 808_3 to a QoS core controller 302 via a "QoS CE CTRL ADD: V_a, (C_(j,1), C_(j,2), . . . , C_(j,CR_j))" message, wherein CRS indicates the receiving QoS core controller 302, (C_(j,1), C_(j,2), . . . , C_(j,CR_j)) indicates the QoS parameter set 902_3 for the receiving QoS core controller 302, and V_a represents the identifier 901 of the provider 500 of the industry vertical and/or service. Each one of the QoS core controllers 302 receives 808_3 the respective core specific QCI 900_3 and ads it to its QCI records. Subsequently, each one of the QoS core controllers 302 transmits 809_3 a respective QCI addition response. The QCI addition response indicates whether the addition of the respective core specific QCI 900_3 succeeded or failed. If the addition succeeds, the QCI addition response is, for example, a "QoS CO CTRL ADD Success: <a local index or ID at CR_j>" message. If the addition fails, the QCI addition response is, for example, a "QoS CO CTRL ADD Fail" message.

If the additions at all QoS edge controllers 301_1, 301_2 and at all QoS core controllers 302 succeed, the QoS central controller 303 finalizes 810 the QCI generation and, thus, the generation of the requested new QoS class. For this purpose, the QoS central controller records the newly created QCIs in its system. Further, the QoS central controller 303 transmits 811 to the provider 500 of the industry vertical and/or service a new QoS class response indicating the global CID 900 of the newly introduced QoS class. The new QoS class response is, for example, a "QoS CE CTRL Policy ADD: <new QoS Class ID>" message.

Figure 10:
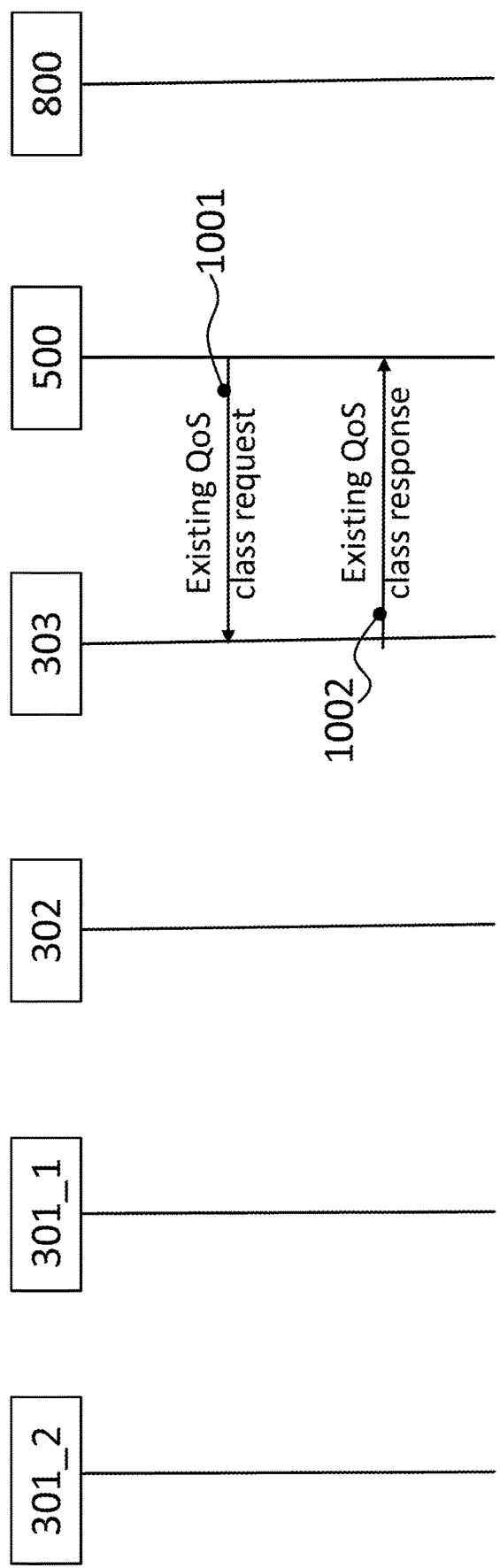
FIG. 10 shows steps executed for requesting information on one or more existing QoS classes according to an embodiment of the present invention.

FIG. 10 shows steps executed for requesting information on one or more existing QoS classes according to an embodiment of the present invention. A provider 50 of an industry vertical and/or service has the possibility of obtaining information on existing QoS policies, i.e. on existing QoS classes and the respective QCIs. According to the embodiment of FIG. 10, the QoS central controller 303 is configured to provide a list of existing QoS classes to the provider 50 of the industry vertical and/or service.

In step 1001, the provider 500 of the industry vertical and/or service transmits an existing QoS class request to the QoS central controller 303 for requesting information on existing QoS policies, i.e. on existing QoS classes and the respective QCIs. The existing QoS class request is, for example, a "QoS CE CTRL Policy QUERY List" message. The QoS central controller receives 1001 the existing QoS class request. In response to the reception 1001 of the existing QoS class request from the provider 500 of the industry vertical and/or service, the QoS central controller 303 determines the existing QoS policies in the communication network 200, i.e. the existing QoS classes and the respective QCIs in the communication network 200. The QoS central controller 303 holds a list of existing QCIs in the communication network 200, as explained above. Thus, for example, a search for one or more QCIs comprising or indicating to the identifier of the provider 500 of the industry vertical and/or of the service, which transmitted 1001 the existing QoS class request is executed in the list of existing QCIs in the communication network 200. As explained above, according to the QCI structure 100, where an identifier field 101 for an identifier of a provider of an industry vertical and/or service is present, each QCI comprises an identifier field 101 for a corresponding identifier of a provider 500 of an industry vertical and/or service.

In step 1002, the QoS central controller 303 transmits an existing QoS class response. The existing QoS class response comprises the list of existing QoS policies in the communication network 200, i.e. the existing QoS classes and the respective QCIs in the communication network 200. The existing QoS class response is, for example, a "QoS CE CTRL Policy QUERY Response: <List of QoS classes with their IDs and parameters>", where <List of QoS classes with their IDs and parameters> comprises the existing QoS classes, i.e. the existing QCIs in the communication network 200.

According to an embodiment, the provider 500 of an industry vertical and/or service requests information on one or more existing QoS classes for verifying the QoS classes. If an existing QoS class or its QCI, respectively, does not comprise a QoS parameter set as desired, the provider 500 is enabled to request an amendment or deletion of the existing QoS class, as mentioned above and as shown in the following. Thus, the requesting of information on one or more existing QoS classes may precede the amending or the deletion of an existing class, as described in the following.

Figure 11:
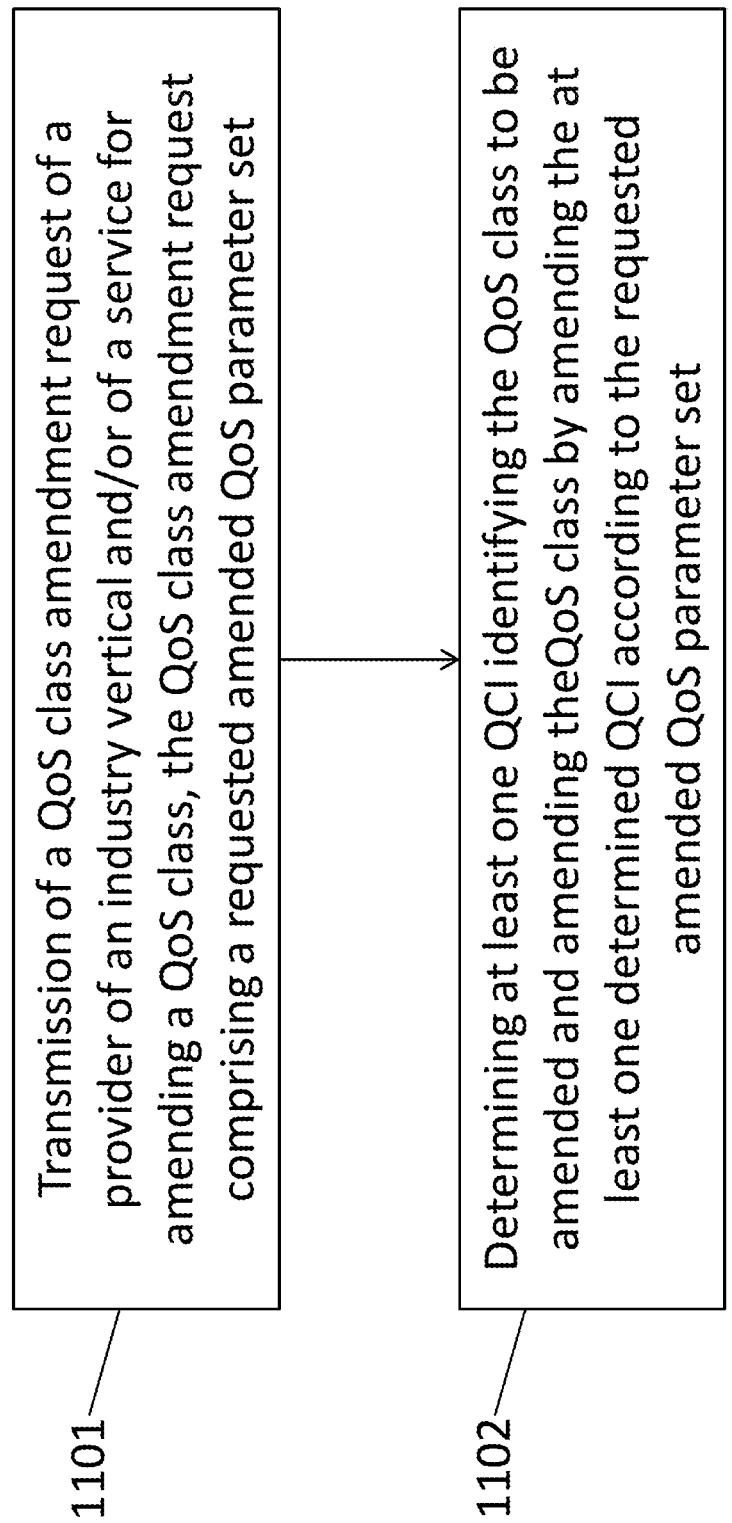
FIG. 11 shows steps executed for amending an existing QoS class according to an embodiment of the present invention.

FIG. 11 shows steps executed for amending an existing QoS class according to an embodiment of the present invention. The steps for amending an existing QoS class, shown in FIG. 11, are generally executed by the QoS central controller 303 (e.g. one or more processing entities 403_1 of the QoS central controller 303). However, as shown below, also the one or more QoS sub-network controllers 301, 301_1, 301_2, . . . , 301_n, 202 (i.e. the one or more QoS core controllers 302 and the one or more QoS edge controllers 301_1, . . . , 301_n) are arranged to support the execution of the amending of an existing QoS class.

In step 1101, a transmission of a QoS class amendment request of a provider 500 of an industry vertical and/or of a service for amending a QoS class is executed. The QoS class amendment request comprises a requested amended QoS parameter set. In particular, the provider 500 of the industry vertical and/or of the service transmits 1101 the QoS class amendment request to the QoS central controller 303. The QoS central controller 303 receives 1101 the QoS class amendment request. Because the QoS class amendment request is a request of a particular provider 500 of an industry vertical and/or of a service, the QoS class amendment request indicates also the identifier of the provider 500 of the industry vertical and/or of the service of the QoS class or QCI, respectively, to be amended.

In step 1102, a determining of at least one QCI identifying the QoS class to be amended and amending the QoS class by amending the at least one determined QCI according to the requested amended QoS parameter set are executed. Generally, step 1102 is executed by QoS central controller 303 (e.g. one or more processing entities 403_1 of the QoS central controller 303). However, as shown below, also the one or more QoS sub-network controllers 301, 301_1, 301_2, . . . , 301_n, 202 (i.e. the one or more QoS core controllers 302 and the one or more QoS edge controllers 301_1, . . . , 301_n) are arranged to support the execution of step 1102.

FIG. 12 shows sub-steps executed for amending the existing QoS class according to an embodiment of the present invention. In particular, FIG. 12 shows sub-steps of the above-described step 1102, in which the QoS class is amended. Thus, the embodiment of FIG. 12 supplements the embodiment of FIG. 11 such that step 1102 comprises steps of FIG. 12 as its sub-steps. The steps of FIG. 11 are executed, in general, by the QoS central controller 303 (e.g., by the one or more processing entities 403_1 of the QoS central controller 303). However, as shown below, also the one or more QoS sub-network controllers 301, 301_1, 301_2, . . . , 301_n, 202 (i.e. the one or more QoS core controllers 302 and the one or more QoS edge controllers 301_1, . . . , 301_n) are arranged to support the execution of the steps of FIG. 12.

If the communication network 200 comprises sub-networks (e.g., one or more RANs 201_1, . . . , 201_n, and/or one or more core networks 202), the steps of FIG. 12 are executed with regard to each one of the sub-networks of the communication network 200.

In step 1201, policies allowed for the provider 500 of the industry vertical and/or service in the communication network 200 and/or in the respective sub-network 201_1, . . . , 201_n, 202 are verified. If the QoS class amendment request is not allowable 1202 in view of the policies in the communication network 200 and/or in the respective sub-network 201_1, . . . , 201_n, 202, the requested amendment of the QoS class is terminated in step 1203. If the QoS class amendment request is allowable 1202 in view of the policies in the communication network 200 and/or in the respective sub-network 201_1, . . . , 201_n, 202, capabilities towards the provider 500 of the industry vertical and/or of the service in the communication network 200 and/or in the respective sub-network 201_1, . . . , 201_n, 202 are verified in step 1204.

In step 1205, at least one QCI, which identifies the QoS class to be amended, is determined. The determining 1205 is executed, for example, by use of the identifier of the provider 500 of the industry vertical and/or of the service, which requests 1101 the amendment of the QCI class. The identifier is comprised also in the QCI according to the QCI structure 100, where an identifier field 101 for an identifier of a provider of an industry vertical and/or service is present. The QoS central controller 303 holds a list of existing QCIs in the communication network 200, as explained above. Thus, a search for a QCI comprising or indicating to the identifier of the provider 500 of the industry vertical and/or of the service, which requests 1101 the amendment of the QCI class, is executed in the list of existing QCIs in the communication network 200 managed by the QoS central controller 303. The at least one QCI is determined as the at least one QCI found by the search in the list of existing QCIs.

Subsequently, in step 1205, the QoS class is amended by amending the at least one determined QCI. The at least one determined QCI is amended 1205 according to the requested amended QoS parameter set. Further, the at least one determined QCI is amended 1205 according to the capabilities, verified in step 1204. Here, the amended QoS parameter set 102 for the amended QCI is intended at first to comprise the QoS parameters of the requested amended QoS parameter set. However, in view of the verified 1204 capabilities, the QoS parameters, as requested in the requested amended QoS parameter set, are adjusted (e.g., amended and/or deleted). Thus, the amended QoS parameter set 102 of the amended QCI does not necessarily comprise all QoS parameters of the requested amended QoS parameter set, it may comprise QoS parameters of the requested amended QoS parameter set adjusted in view of the verified 1204 capabilities. The identifier field 101 in the amended QCI indicating the provider 500 of the industry vertical and/or of the service remains unchanged.

Figure 13A:
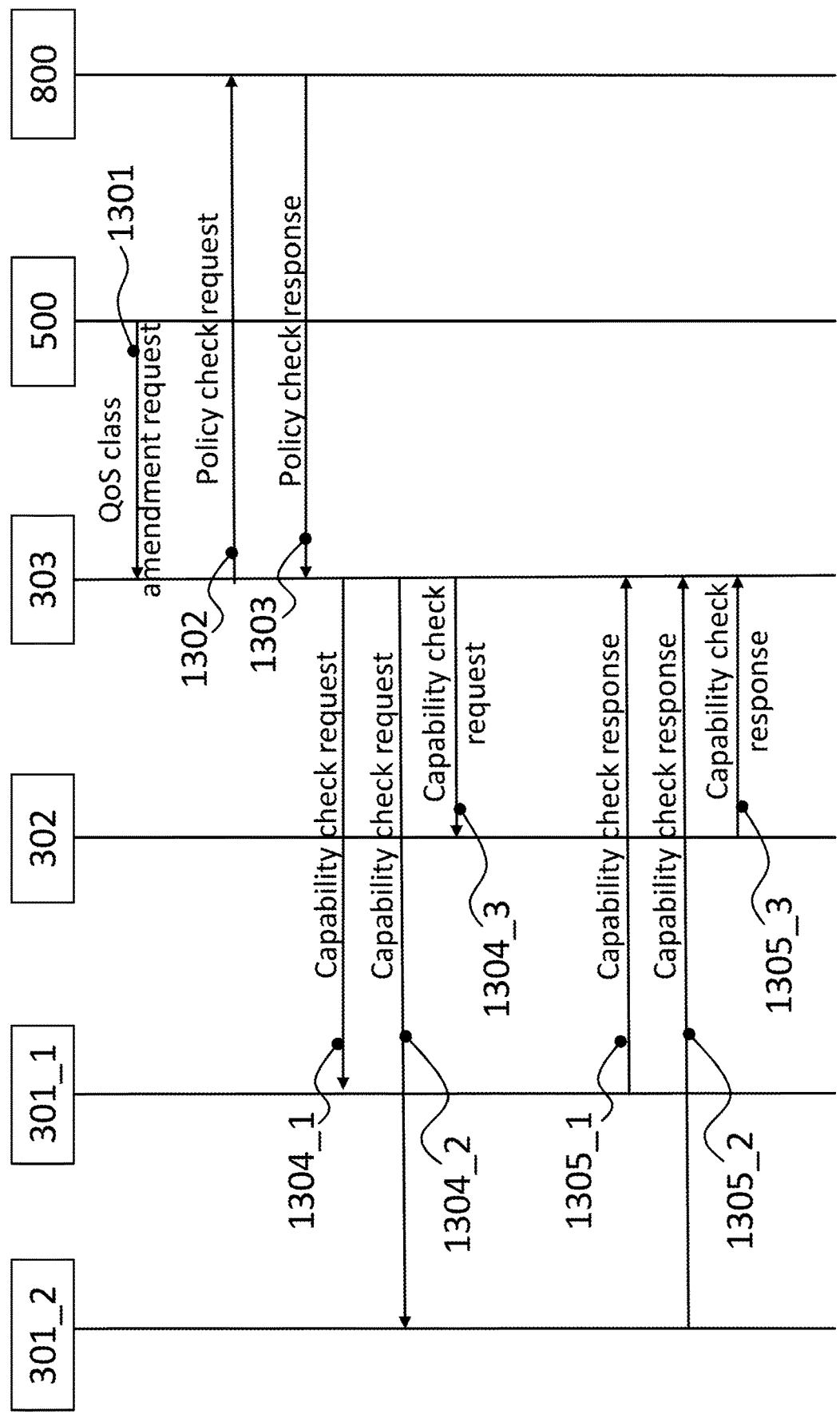
FIGS. 13a, 13b show steps executed for amending an existing QoS class according to an embodiment of the present invention.
Figure 13B:
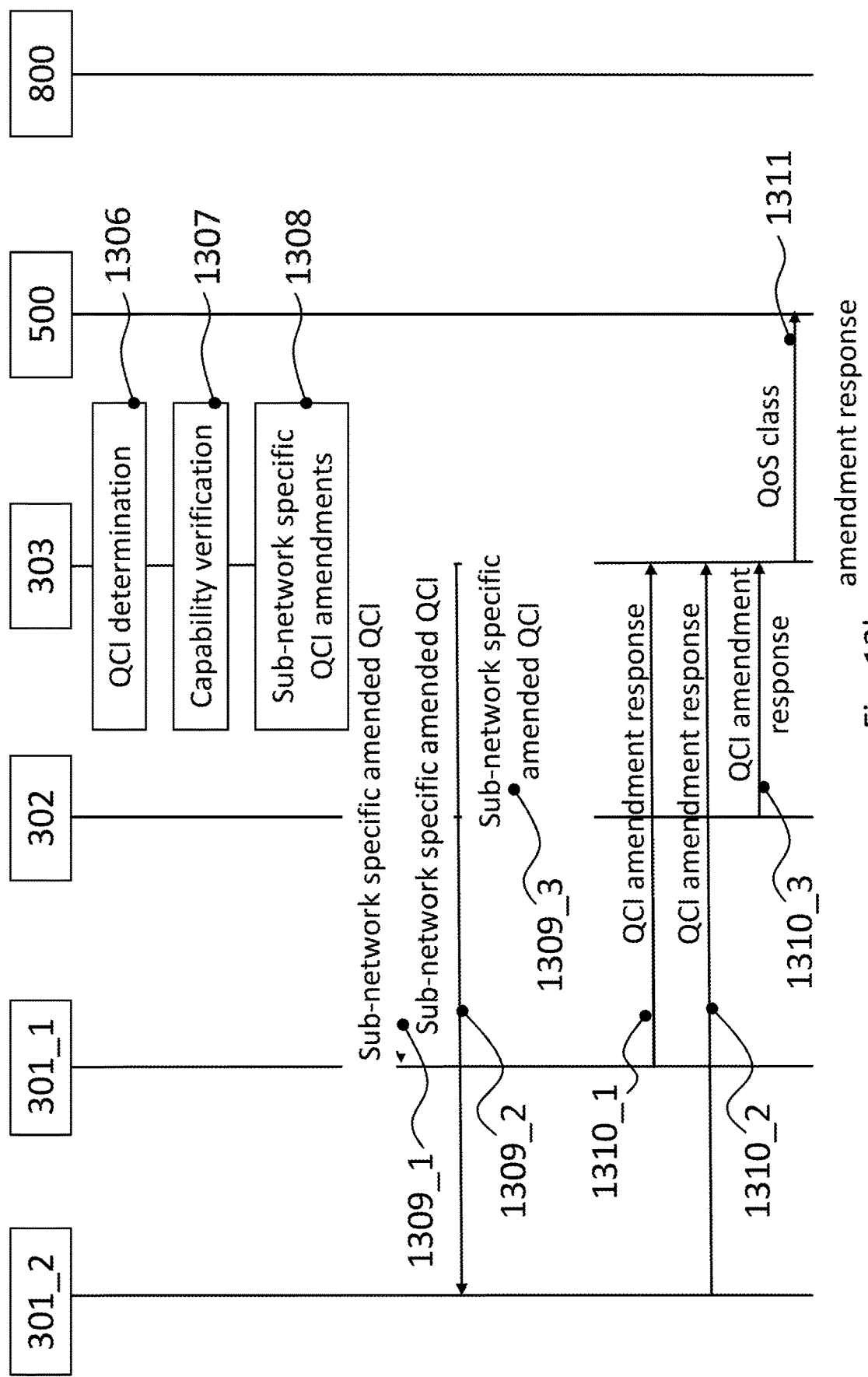

FIGS. 13a and 13b show steps executed for amending an existing QoS class according to an embodiment of the present invention. The embodiment of FIGS. 13a and 13b represents a more concrete specification of the embodiments of FIGS. 11 and 12. Thus, it is possible to incorporate accordingly into the embodiments of FIGS. 11 and 12 one or more of steps described with regard to FIGS. 13a and 13b.

According to the embodiment of FIGS. 13a end 13b, in order to modify an existing QoS class, a provider 500 of an industry vertical and/or of a service, which desires the amendment of the QoS class, transmits 1301 a QoS class amendment request to the QoS central controller 303. The QoS class amendment request is, for example, a message "QoS CE CTRL Policy MODIFY: <ID>, S_1, S_2, . . . , S_N", where S_1, S 2, . . . , S_N are the amended QoS parameters for the QoS class designated by an "ID" (identification), which is a QCI, at the QoS central controller 303. As mentioned, the QoS central controller 303 manages a list of existing QoS classes or QCIs, respectively.

The QoS central controller 303 first checks this QoS class modification request against the allowed policies for the provider 500 of the industry vertical and/or the service (see step 1201 of FIG. 12) in the communication network 200 and/or in one or more sub-networks 201_1, . . . , 201_n, 202. For verifying the policies, the QoS central controller 303 transmits 1302 a policy check request to the policy setting entity 800, wherein the transmission of the policy check request is executed in the same way as described above with regard to step 802. Also here, the policy check request is, for example, a "QoS CE CTRL Policy Check: (V_a, S_1, S_2, . . . , S_N)" message, where V_a represents the identifier of the provider 500 of the industry vertical and/or of the service. The policy setting entity 800 checks then the requested amended QoS class (in particular, the requested amended QoS parameters (e.g., S_1, S 2, . . . , S_N)) against the allowed ones specified in the records of the policy setting entity 800. Subsequently, the policy setting entity 800 transmits 1303 a policy check response to the QoS central controller 303. The policy check response indicates, whether the requested amendment the existing QoS class is allowable or not in view of the existing policies. For example, the policy check response is a "QoS Policy PCEF Check Pass" message if the amendment of the existing QoS class is allowed, and the policy check response is a "QoS Policy PCEF Check Fail" message if the amendment of the existing QoS class is not allowed. If the amendment of the existing QoS class is not allowed, the QoS central controller 303 turns directly to step 1311 and transmits 1311 a QoS class amendment response to the provider 500 of the industry vertical and/or of the service, wherein the QoS class amendment response indicates that the amendment of the QoS class failed in view of the policies allowed for the provider 500 in the communication network 200 and/or in one or more sub-networks 201_1, . . . , 201_n, 202. In this case, the QoS class amendment response is, for example, a "QoS CE CTRL Policy MODIFY Fail" message.

In case the amendment of the existing QoS class is allowed in view of the policies, the QoS central controller 303 verifies capabilities of the sub-networks towards the provider 500 of the industry vertical and/or of the service (see step 1204 of FIG. 12). For this purpose, the QoS central controller 303 requests each QoS sub-network controller 301, 301_1, . . . , 301_n, 202 for its capabilities towards the provider 500 of the industry vertical and/or of the service. Similarly to FIGS. 8a to 8c, in FIGS. 13a and 13b the QoS edge controllers 301, 301_1, . . . , 301n, are represented exemplary by two QoS edge controllers 301_1, 301_2, wherein also one or more than two QoS edge controllers 301, 301_1, . . . , 301n are possible too. Further, only one QoS core controller 302 is shown exemplary in FIGS. 13a and 13b, wherein also more than one QoS core controllers 302 are possible too. Thus, as shown exemplary in FIGS. 13a and 13b, the QoS central controller 303 transmits 1304_1, 1304_2, 1304_3 a corresponding capability check request for its capabilities towards the provider 500 of the industry vertical and/or service. The capability check request is, for example, a "QoS CE CTRL Edge Capability Request: V_a" message, where V_a represents an index of the provider 500 of the industry vertical and/or of the service, if the capability check request is sent 1304_1, 1304_2 to a QoS edge controller 301_1, 301_2. The capability check request is, for example, a "QoS CE CTRL Core Capability Request: V_a" message if the capability check request is sent 1304_3 to the QoS core controller 302.

Each one of the QoS edge controller(s) 301_1, 301_2 and the QoS core controller(s) 302 responds then by transmitting 1305_1, 1305_2, 1305_3 to the QoS central controller 303 a corresponding capability check response indicating the respective capabilities of the respective QoS edge controller 301_1, 301_2 or QoS core controller. An QoS edge controller 301_1, 301_2 transmits 1305_1, 1305_2, for example, to the QoS central controller 303 a "QoS ED CTRL Capability Response" message as the capability check response comprising capabilities, which the QoS edge controller 301_1, 301_2 can offer for the provider 500 of the industry vertical and/or of the service, the provider 500 having the identifier V_a. Similarly, QoS core controller 302 transmits 1305_3, for example, to the QoS central controller 303 a "QoS CO CTRL Capability Response" message as the capability check response comprising capabilities, which the QoS core controller 302 can offer for the provider 500 of the industry vertical and/or of the service, the provider 500 having the identifier V_a.

In step 1306, the QoS central controller 303 executes a QCI determination. Thus, in the QCI list, managed by the QoS central controller 303, the QoS central controller 303 derives the general QCI 900 and the sub-network specific QCIs 900_1, 900_2, 900_3, each one of them comprising the identifier 901 of the provider 500 of the industry vertical and/or service.

Further, in step 1307 (see also step 1204 of FIG. 127), the QoS central controller 303 executes capability verification. Based on the capability verification 1307 and based on the capability check responses, the QoS central controller 303 executes in step 1308 amendments of the QoS parameters 902 of the general QCI 900 being determined in step 1306 and of the QoS parameters 902_1, 902_2, 902_3 of the sub-network specific QCIs 900_1, 900_2, 900_3, each one of the QCIs 900, 900_1, 900_2, 900_3 being determined in step 1306 (see also step 1205 of FIG. 12). As described above with regard to step 1205, each one of the determined 1306 QCI 900, 900_1, 900_2, 900_3 is amended 1308 according to the requested amended QoS parameter set. Further, each one of the determined 1306 QCIs 900, 900_1, 900_2, 900_3 is amended 1308 according to the capabilities, verified in step 1307. As described above, each one of the QoS parameter sets 902_1, 902_2, 902_3 of the sub-network specific QCIs 900_1, 900_2, 900_3 determined in step 1306 together with the QoS parameter set 902 of the general QCI 900 determined in step 1306 is intended at first to comprise the QoS parameters of the requested amended QoS parameter set. In view of the verified 1307 capabilities, the QoS parameters, as requested in the requested amended QoS parameter set, are adjusted (e.g., amended and/or deleted). Thus, the each one of the amended QoS parameter sets 902, 902_1, 902_2, 902_3 does not necessarily comprise all QoS parameters of the requested amended QoS parameter set, it may comprise QoS parameters of the requested amended QoS parameter set adjusted in view of the verified 1307 capabilities. The identifier field 101 in the amended QCI indicating the provider 500 of the industry vertical and/or of the service remains unchanged.

In view of the differences of the capabilities of the provider 500 of the industry vertical and/or service in the different sub-networks 201_1, . . . , 201_n, 202 of the communication network 200, different amended parameter sets 902, 902_1, 902_2, 902_3 are generated 1308 with regard to the requested QCI class amendment. For each one of the sub-networks 201_1, . . . , 201_n, 202, the respective QCI 900_1, 900_2, 900_3 is amended by amending the respective parameter set 902, 902_1, 902_2, 902_3 according to the requested amended QoS parameter set. Additionally, the respective QCI 900_1, 900_2, 900_3 is amended by amending the respective parameter set 902, 902_1, 902_2, 902_3 in view of the capabilities of the provider 500 of the industry vertical and/or service in the respective sub-network 201_1, . . . , 201_n, 202.

After the execution 1308 of the sub-network 201_1, . . . , 201_n, 202 specific QCI amendments, the QoS central controller 303 informs the respective QoS sub-network controllers 301, 301_1, 301_2, . . . , 301_n, 302 on the amendments of the respective QCIs 900_1, 900_2, 900_3 in steps 1309_1, 1309_2, 1309_3. Particularly, as shown in FIG. 13b, the QoS central controller 303 transmits 1309_1, 1309_2, 1309_3 each one of the sub-network specific amended QCIs 900_1, 900_2, 900_3 to the respective QoS edge controller 301_1, 301_2 or to the respective QoS core controller 302.

If the QoS central controller 303 transmits 1309_1, 1309_2 an edge or RAN specific amended QCI 900_1, 900_2 to a respective QoS edge controller 301_1, 301_2, the message transmitted 1309_1, 1309_2 is, for example, a "QoS CE CTRL MODIFY: <ED_i ID>V_a, (R_(i,1), R_(i,2), . . . , R_(i,ED_i))" message, where V_a is the identifier 901_1, 901_2 of the provider of the industry vertical in the amended edge or RAN specific QCI 900_1, 900_2, and where (R_(i,1), R_(i,2), . . . , R_(i,ED_i)) is the amended QoS parameter set 902_2, 902_2 of the amended edge or RAN specific QCI 900_1, 900_2 for the QoS edge controller ED_i, i.e. QoS edge controller 301_1, 301_2.

If the QoS central controller 303 transmits 1309_3 a core specific amended QCI 900_3 to a respective QoS core controller 302, the message transmitted 1309_3 is, for example, a "QoS CE CTRL MODIFY: <CRj_ID>V_a, (C_(j,1), C_(j,2), . . . , C_(j,CR_j))" message, where V_a is the identifier 901_3 of the provider of the industry vertical in the amended core specific QCI 900_3, and where (C_(j,1), C_(j,2), . . . , C_(j,CR_j)) is the amended QoS parameter set 902_3 of the amended core specific QCI 900_3 for the QoS core controller CR_j, i.e. QoS edge controller 302.

In response to the reception 1309_1, 1309_2, 1309_3 of the sub-network specific amended QCIs 900_1, 900_2, 900_3, the QoS sub-network controllers 301, 301_1, 301_2, . . . , 301_n, 302 execute corresponding QoS class amendments or updates in their QoS class lists or QCI lists, respectively. In particular, they update the respective QoS parameter sets 902_1, 902_2, 902_3 of the respective QCIs 900_1, 900_2, 900_3.

Subsequently, each one of the QoS sub-network controllers 301, 301_1, 301_2, . . . , 301_n, 302 transmits 1310_1, 1310_2, 1310_3 a QCI amendment response to the QoS central controller 303. The QCI amendment response indicates whether the amendment of the respective QCI 900_1, 900_2, 900_3 was successful or failed. A QoS edge controller 301_1, 301_2 transmits 1310_1, 1310_2, for example, as the QCI amendment response a "QoS ED CTRL MODIFY Success" message if the amendment of the respective QCI 900_1, 900_2 was successful, and a "QoS ED CTRL MODIFY Fail" message if the amendment of the respective QCI 900_1, 900_2 failed. Similarly, a QoS core controller 302 transmits 1310_3, for example, as the QCI amendment response a "QoS CO CTRL MODIFY Success" message if the amendment of the respective QCI 900_3 was successful, and a "QoS CO CTRL MODIFY Fail" message if the amendment of the respective QCI 900_3 failed.

After the reception 1310_1, 1310_2, 1310_3 of all QCI amendment responses, i.e. after the reception 1310_1, 1310_2, 1310_3 of a respective QCI amendment response from each one of the QoS sub-network controllers 301, 301_1, 301_2, . . . , 301_n, 302, the QoS central controller 303 transmits 1311 to the provider 500 of the industry vertical and/or of the service a QoS class amendment response. The QoS class amendment response indicates whether the amendment of the QoS class was successful or failed. If the amendment of the QoS class was successful, the QoS central controller 303 transmits 131, for example, a "QoS CE CTRL Policy MODIFY Success" message as the QoS class amendment response. If the amendment of the QoS class failed, the QoS central controller 303 transmits 131, for example, a "QoS CE CTRL Policy MODIFY Fail" message as the QoS class amendment response.

Figure 14:
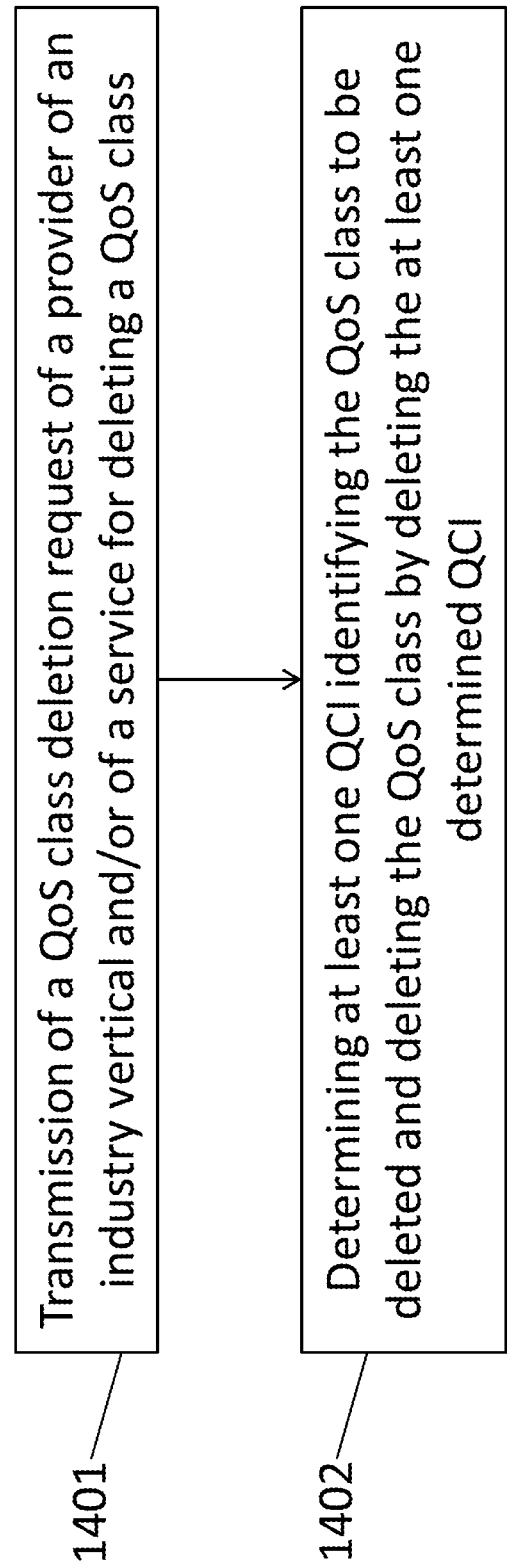
FIG. 14 shows steps executed for deleting an existing QoS class according to an embodiment of the present invention.

FIG. 14 shows steps executed for deleting an existing QoS class according to an embodiment of the present invention. The steps for deleting an existing QoS class, shown in FIG. 14, are generally executed by the QoS central controller 303 (e.g. one or more processing entities 403_1 of the QoS central controller 303). However, as shown below, also the one or more QoS sub-network controllers 301, 301_1, 301_2, . . . , 301_n, 202 (i.e. the one or more QoS core controllers 302 and the one or more QoS edge controllers 301_1, . . . , 301_n) are arranged to support the execution of the deletion of an existing QoS class.

In step 1401, a transmission of a QoS class deletion request of a provider 500 of an industry vertical and/or of a service for deleting a QoS classis executed. In step 1402, at least one QCI identifying the QoS class to be deleted is determined, and the QoS class is deleted by deleting the at least one determined QCI. The determining 1402 is executed, for example, by use of the identifier of the provider 500 of the industry vertical and/or of the service, which requests 1401 the deletion of the QCI class. The identifier is comprised also in the QCI according to the QCI structure 100, where an identifier field 101 for an identifier of a provider of an industry vertical and/or service is present. As described above, the QoS central controller 303 holds a list of existing QCIs in the communication network 200. Thus, a search for a QCI comprising or indicating to the identifier of the provider 500 of the industry vertical and/or of the service, which requests 1401 the deletion of the QCI class, is executed in the list of existing QCIs in the communication network 200 managed by the QoS central controller 303. The at least one QCI is determined as the at least one QCI found by the search in the list of existing QCIs. Subsequently, the at least one determined QCI is deleted in step 1402.

Figure 15:
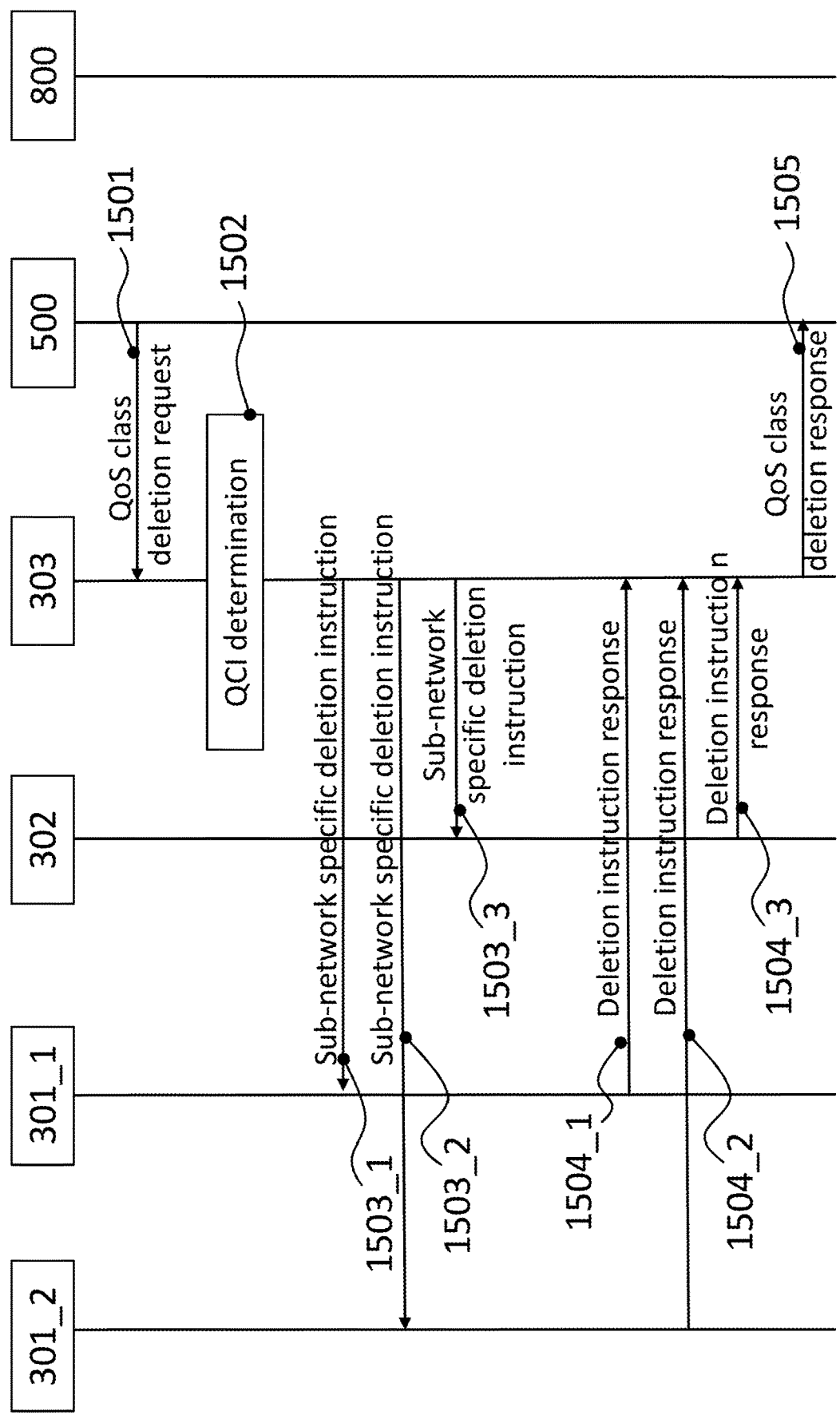
FIG. 15 shows steps executed for deleting an existing QoS class according to an embodiment of the present invention.

FIG. 15 shows steps executed for deleting an existing QoS class according to an embodiment of the present invention. The embodiment of FIG. 15 represents a more concrete specification of the embodiment of FIG. 14. Thus, it is possible to incorporate accordingly into the embodiment of FIG. 14 one or more of steps described with regard to FIG. 15.

According to the embodiment of FIG. 15, a provider 500 of an industry vertical and/or of a service transmits 1501 to the QoS central controller 300 a QoS class deletion request. The QoS class deletion request is, for example, a "QoS CE CTRL Policy DEL: <ID>" message, where <ID> (identification) is the general CID 900 of the QoS Class to be deleted. In step 1502, the QoS central controller 303 retrieves or determines then from its records or from its CQI/QoS class lists, respectively, all sub-network specific CIDs 900_1, 900s_2, 900_3 that correspond to the QoS class to be deleted, i.e. to the general CID 900. After retrieving the sub-network specific CIDs 900_1, 900s_2, 900_3, the QoS central controller 303 transmits 1503_1, 1503_2, 1503_3 to each one of the QoS sub-network controllers 301, 301_1, 301_2, . . . , 301_n, 302 a corresponding sub-network specific deletion instruction. Each one of the sub-network specific deletion instructions indicates the respective sub-network specific CID 900_1, 900s_2, 900_3 to be deleted in the respective sub-network 201_1, . . . , 201_n, 202. If the QoS central controller 303 transmits 1503_1, 1503_2 a sub-network specific deletion instruction to a QoS edge controller 301_1, 301_2, the sub-network specific deletion instruction is, for example a "QoS CE CTRL DEL: <ED_i ID>" message for the QoS edge controller ED_i or QoS edge controller 301_1, 301_2, respectively, where ED_i ID indicates the respective edge or RAN specific CID 900_1, 900s_2. If the QoS central controller 303 transmits 1503_3 a sub-network specific deletion instruction to a QoS core controller 302, the sub-network specific deletion instruction is, for example a "QoS CE CTRL DEL: <CR_j ID>" message for the QoS core controller CR_j or QoS core controller 302 respectively, where CF_j ID indicates the respective core specific CID 900_3. After the reception 1503_1, 1503_2, 1503_2 of the respective sub-network specific deletion instruction, each one of the QoS sub-network controllers 301, 301_1, 301_2, . . . , 301_n, 302 deletes the QoS class or the sub-network specific CID 900_1, 900_2, 900_3 from its local CID list or QoS class list respectively.

In steps 1504_1, 1504_2, 1504_3, each one of the QoS sub-network controllers 301, 301_1, 301_2, . . . , 301_n, 302 transmits then a respective deletion instruction response to the QoS central controller 303. A deletion instruction response indicates whether the deletion of the respective QoS class or sub-network specific CID 900_1, 900s_2, 900_3 respectively was successful or failed. Further, also the QoS central controller 303 deletes all records or entries in its QoS class or CQI table referring to the QoS class to be deleted. I.e. the QoS central controller 303 deletes any information on the general CQI 900 of the QoS class to be deleted and any information on the respective sub-network specific CQIs 900_1, 900_2, 900_3 of the QoS class to be deleted. In step 1505, the QoS central controller 505 transmits to the provider 500 of the industry vertical and/or of the service a QoS class deletion response. The QoS class deletion response indicates whether the deletion of the QoS class was successful or failed.

Further, in addition to the aforesaid, any of the one or more QoS core controllers 302 in the communication network 200 has the following functions with regard to the addition of a new QoS class, the amendment of an existing QoS class, and the deletion of an existing QoS class.

In case of the addition of a new QoS class and/or of the amendment of an existing QoS class, the QoS core controller 302 configures the nodes or devices of the core network 202 with regard to packet classification/identification and/or with regard to policy enforcement.

For example, when configuring the nodes or devices of the core network 202 with regard to packet classification/identification, the QoS core controller 302 adds/amends the traffic classifier and packet marking policy in the core network 202 in view of the new/amended QoS class. In bearer-based implementations, the QoS core controller 302 adds/amends, for example, the traffic flow template (TFT) in view of the new/amended QoS class. In bearer less implementations, the QoS core controller 302 adapts/amends, for example, one or more packet filters and/or one or more data flow entries at the edge/RAN nodes or edge/RAN devices in the core network 202 in view of the new/amended QoS class.

When configuring the nodes or devices of the core network 202 with regard to the policy enforcement, the QoS core controller 302 adds/updates one or more QoS policy enforcements related to the new/amended QoS class. E.g., the QoS core controller 302 adds/updates admission control, ARP, diffSev according to the packet marking. Further, the QoS core controller 302 amends the enforcement of the QoS classes affected by the new/amended QoS class.

In case of the deletion of an existing QoS class, the QoS core controller 302 configures the nodes or devices of the core network 202 in view of the deleted QoS class, for example, by deleting the traffic classifier and packet marking policy and/or by deleting one or more QoS policy enforcements related to the deleted QoS class.

Further, in addition to the aforesaid, any of the one or more QoS edge or RAN controllers 301, 301_1, 301_2, . . . , 301_n in the communication network 200 has the following functions with regard to the addition of a new QoS class, the amendment of an existing QoS class, and the deletion of an existing QoS class.

In case of the addition of a new QoS class and/or of the amendment of an existing QoS class, the QoS edge controller 301, 301_1, 301_2, . . . , 301_n configures the nodes or devices of the RAN or edge network 201_1, . . . , 201_n with regard to packet classification/identification and/or with regard to policy enforcement.

For example, when configuring the nodes or devices of the RAN or edge network 201_1, . . . , 201_n with regard to packet classification/identification, the QoS edge controller 301, 301_1, 301_2, . . . , 301_n adds/amends in view of the new/amended QoS class TFT and/or ARP based on the QoS requirement from the QoS central controller 303 and transmits this list to the access network (AN). In bearer-based implementations, the QoS edge controller 301, 301_1, 301_2, . . . , 301_n adds/amends, for example, the TFT. In bearer less implementations, the QoS edge controller 301, 301_1, 301_2, . . . , 301_n adds/amends, for example, one or more packet filters and/or one or more data flow entries.

When configuring the nodes or devices of the RAN or edge network 201_1, . . . , 201_n with regard to the policy enforcement, the QoS edge controller 301, 301_1, 301_2, . . . , 301_n adds/updates one or more QoS policy enforcements related to the new/amended QoS class. E.g., the QoS edge controller 301, 301_1, 301_2, . . . , 301_n adds/updates admission control, ARP, diffSev according to the packet marking. Further, the QoS edge controller 301, 301_1, 301_2, . . . , 301_n amends the enforcement of the QoS classes affected by the new/amended QoS class.

In case of the deletion of an existing QoS class, the QoS edge controller 301, 301_1, 301_2, . . . , 301_n configures the nodes or devices of the RAN or edge network 201_1, . . . , 201_n in view of the deleted QoS class, for example, by deleting the traffic classifier and packet marking policy and/or by deleting one or more QoS policy enforcements related to the deleted QoS class.

Figure 16:
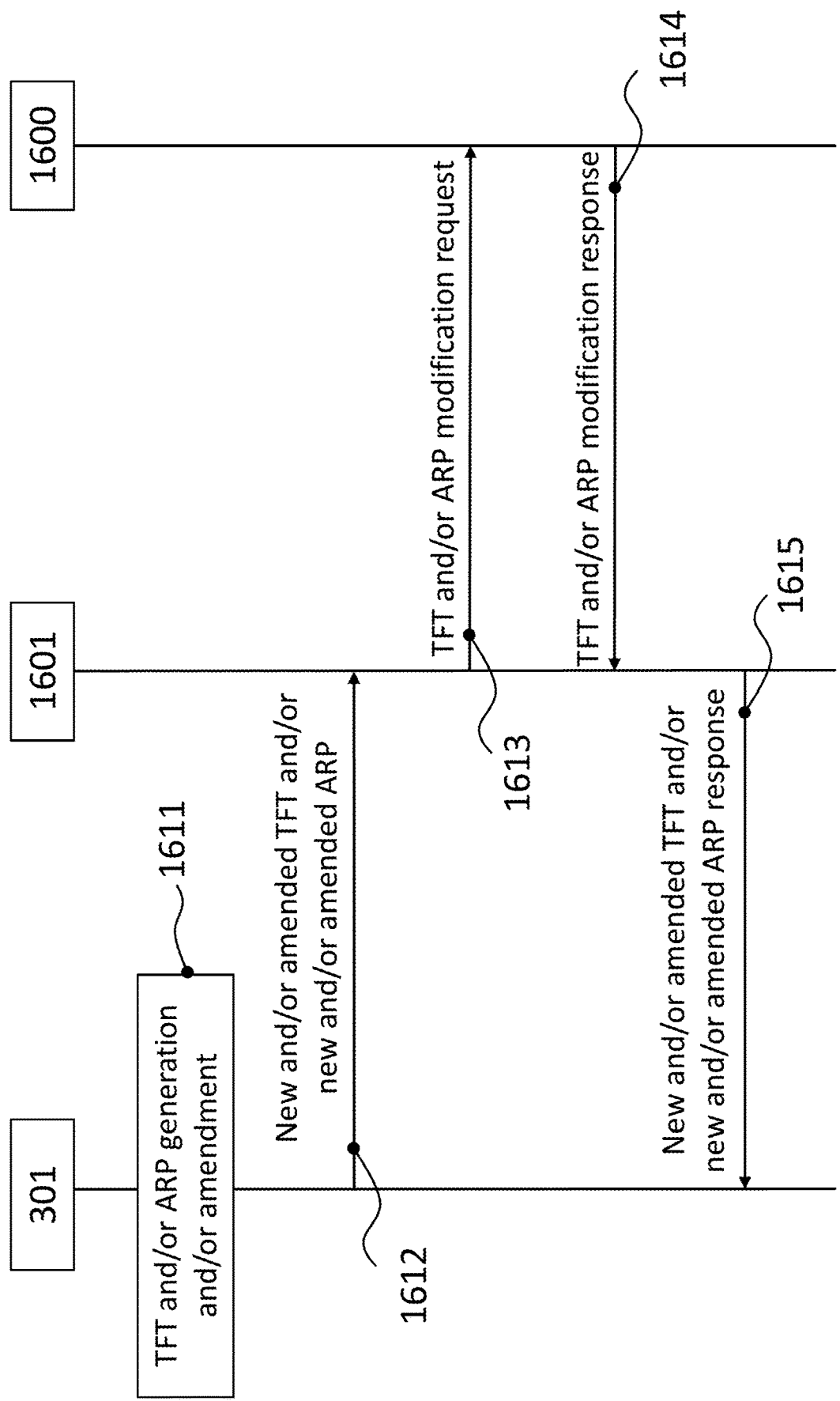
FIG. 16 shows sub-network configuration steps executed by a QoS edge controller in response to an addition of a new QoS class or in response to an amendment of an existing QoS class according to an embodiment of the present invention.

FIG. 16 shows exemplary sub-network configuration steps executed by a QoS edge controller 301, 301_1, 301_2, . . . , 301_n in response to an addition of a new QoS class or in response to an amendment of an existing QoS class according to an embodiment of the present invention. According to the present embodiment, the addition of the new QoS class or the amendment of the existing QoS class has been executed as explained above by use of the QCI structure 100. I.e. the QCI of the new or existing QoS class is arranged according to the QCI structure 100 and comprises a corresponding identifier 101 of the industry vertical or of the service provider, with regard to which the respective QoS class has been added or amended, and a corresponding QoS parameter set 102.

In response to the addition or amendment of the respective QoS class, the QoS edge controller 301 generates and/or amends in step 1611 one or more traffic flow templates (TFTs) and/or one or more allocation and retention priorities (ARPs) according to the added/new or amended QoS class. The QoS edge controller 301 of FIG. 16 is to be seen as a representative of any of the QoS edge controllers 301, 301_1, 301_2, . . . , 301_n discussed herein.

In step 1612, the QoS edge controller 301 transmits the one or more new and/or amended TFTs and/or one or more new and/or amended ARPs to each one of one or more access nodes (AS) 1601 of the sub-network (i.e. edge network or RAN network respectively) 201_1, . . . , 201_n of the QoS edge controller 301, in which the QoS edge controller 301 controls the management and use of the QoS classes. According to an embodiment, the one or more new and/or amended TFTs and/or one or more new and/or amended ARPs are transmitted 1612 in a corresponding request message, by use of which the QoS edge controller 301 requests a respective addition and/or amendment of the one or more new and/or amended TFTs and/or one or more new and/or amended ARPs. Each one of the AS 1601 notifies (e.g., stores) then the one or more new and/or amended TFTs and/or one or more new and/or amended ARPs and uses the one or more new and/or amended ARPs for further communication in the sub-network (i.e. edge network or RAN network respectively) 201_1, . . . , 201_n of the QoS edge controller 301. E.g., each one of the AS 1601 modifies the set(s) of TFTs and/or of ARPs, held by the AS 1601, according to the one or more new and/or amended TFTs and/or one or more new and/or amended ARPs. For example, each one of the AS 1601 amends one or more existing TFTs and/or adds one or more new TFTs according to the received 1612 one or more new and/or amended TFTs. Further, each one of the AS 1601 amends one or more existing ARPs and/or adds one or more new ARPs according to the received 1612 one or more new and/or amended ARPs. Generally, the notification or modification respectively of the TFTs and/or of the ARPs is executable as generally known at the ASs 1600.

In step 1613, each one of the one or more AS 1601 transmits the one or more new and/or amended TFTs and/or one or more new and/or amended ARPs to each one of one or more user communication devices 1600 connected to the respective AS 1601. According to an embodiment, the one or more new and/or amended TFTs and/or one or more new and/or amended ARPs are transmitted 1613 in a corresponding request message, by use of which the respective AS 1601 requests a corresponding addition and/or amendment of the one or more new and/or amended TFTs and/or one or more new and/or amended ARPs. Each one of the user communication devices 1600 notifies (e.g., stores) then the one or more new and/or amended TFTs and/or one or more new and/or amended ARPs and uses the one or more new and/or amended TFTs and/or one or more new and/or amended ARPs for further communication in the sub-network (i.e. edge network or RAN network respectively) 201_1, . . . , 201_n of the QoS edge controller 301. E.g., each one of the user communication devices 1600 modifies the set(s) of TFTs and/or of ARPs, held by the user communication device 1600, according to the one or more new and/or amended TFTs and/or one or more new and/or amended ARPs. For example, each one of the user communication devices 1600 amends one or more existing TFTs and/or adds one or more new TFTs according to the received 1613 one or more new and/or amended TFTs. Further, each one of the user communication devices 1600 amends one or more existing ARPs and/or adds one or more new ARPs according to the received 1613 one or more new and/or amended ARPs. Generally, the notification or modification respectively of the TFTs and/or of the ARPs is executable as generally known at the user communication devices 1600.

In step 1614, each one of the user communication devices 1600 transmits a modification response to the respective AS 1601, from which the user communication device 1600 received the one or more new and/or amended TFTs and/or one or more new and/or amended ARPs. According to an embodiment, the modification response comprises an indication, indicating whether the TFT and/or ARP notification or modification respectively according to the one or more new and/or amended TFTs and/or one or more new and/or amended ARPs as received in step 1613 succeeded or failed.

In step 1615, each one of the AS 1601 transmits a modification response to the QoS edge controller 301. According to an embodiment, the modification response comprises an indication, indicating whether the TFT and/or ARP notification or modification respectively according to the one or more new and/or amended TFTs and/or one or more new and/or amended ARPs as received in step 1612 succeeded or failed.

The execution of steps 1614 and/or 1615 is optional. Thus, embodiments exist, in which the transmission 1614, 1615 of the respective modification responses is not mandatory or necessary.

For the communication between the QoS edge controller 301, the AS(s) 1601, and the user communication devices 1600 is executable according to any one of known communication standards and/or protocols. For example, the step 1613 can be executed according to the radio resource control (RRC) protocol used by access points such as 1601, wherein embodiments of the present invention are not limited to this protocol only.

Figure 17:
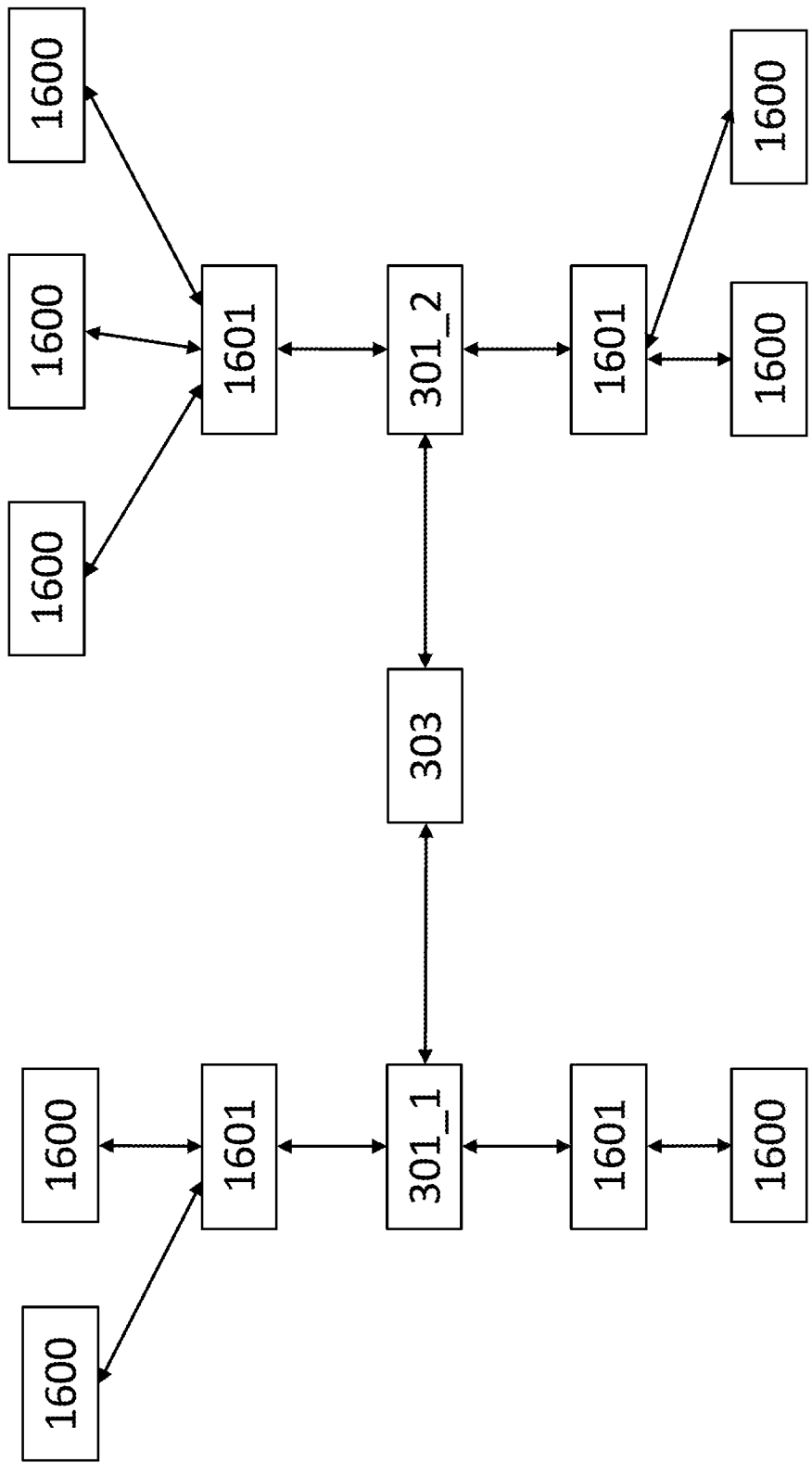
FIG. 17 shows a general view on configuration of nodes or devices of a RAN or edge network respectively according to an embodiment of the present invention.

FIG. 17 shows a general view on configuration of nodes or devices of a RAN or edge network respectively according to an embodiment of the present invention. After the addition of a new QoS class or after an amendment of an existing QoS class, the QoS central controller 303 informs the one or more QoS edge controllers 301_1, 301_2 on the new or amended QoS class. The one or more QoS edge controllers 301_1, 301_2 are representatives of any one of the QoS edge controllers 301, 301_1, 301_2, . . . , 301_n considered herein. Each one of the one or more QoS edge controllers 301_1, 301_2 generates 1611 one or more new TFTs and/or one or more new ARPs and/or amends 1611 one or more existing TFTs and/or one or more existing ARPs according to the amended or new QoS class. Subsequently, each one of the one or more QoS edge controllers 301_1, 301_2 transmits 1612 the one or more new and/or amended TFTs and/or the one or more new and/or amended ARPs to one or more APs 1601 in its RAN or edge network 201_1, . . . , 201_n respectively. Each one of the APs 1601, in turn, informs 1613, then, the one or more user communication devices 1600, connected to the respective AP 1601, on the one or more new and/or amended TFTs and/or the one or more new and/or amended ARPs. As mentioned above, the execution of modification response transmission steps 1614 and/or 1615 is optional.

The communication between the QoS central controller 303, the one or more QoS edge controllers 301_1, 301_2, the one or more APs 1601, and the one or more user communication devices 1600 is indicated in FIG. 17 by arrows between the respective components.

Thus, as shown above by use of FIGS. 16 and 17, if a sub-network 201_1, . . . , 201_n, 202, in which a QoS sub-network controller 301, 301_1, 301_2, . . . , 301_n, 302 configures devices by use of QoS classes, is a RAN or edge network 201_1, . . . , 201_n, i.e. if the QoS sub-network controller 301, 301_1, 301_2, . . . , 301_n, 302 is a QoS edge controller QoS sub-network controller 301, 301_1, 301_2, . . . , 301_n, the QoS sub-network controller (i.e. the QoS edge controller) 301, 301_1, 301_2, . . . , 301_n is configured to: generate 1611 a configuration information (e.g., one or more new and/or amended TFTs and/or one or more new and/or amended ARPs) according to a QCI of a new or amended QoS class; and transmit (see step 1612) the configuration information to one or more APs 1601 of the sub-network 201_1, . . . , 201_n (i.e. of the RAN or edge network respectively) such that each one of the one or more APs 1601 of the sub-network 201_1, . . . , 201_n is enabled to configure (see step 1613) one or more user communication devices 1600, connected to the respective AP 1601, by use of the configuration information.

It has to be noted that also the QoS core controller 302 is configured execute a corresponding configuration of nodes or devices with the difference that the QoS core controller configures nodes or devices of the respective core network 202. This is shown in FIG. 18.

Figure 18:
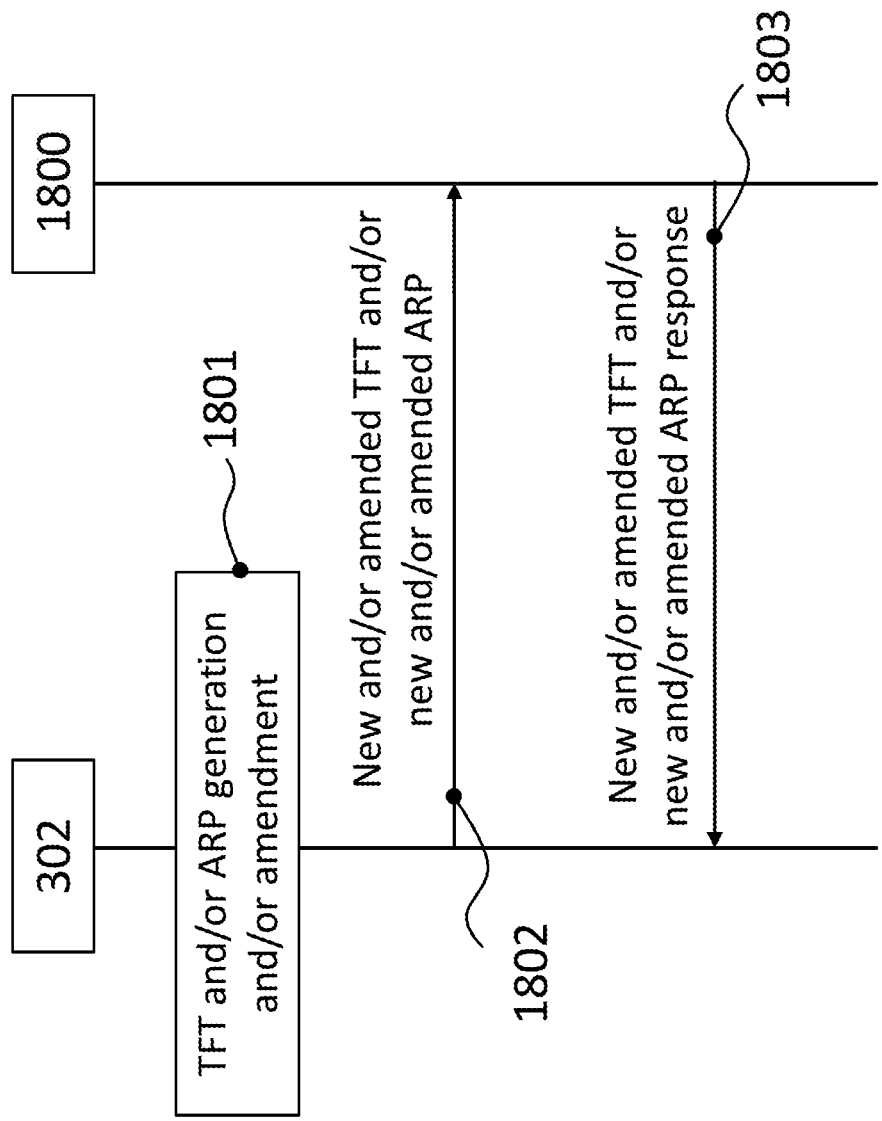
FIG. 18 shows sub-network configuration steps executed by a QoS core controller in response to an addition of a new QoS class or in response to an amendment of an existing QoS class according to an embodiment of the present invention.

FIG. 18 shows sub-network configuration steps executed by a QoS core controller 302 in response to an addition of a new QoS class or in response to an amendment of an existing QoS class according to an embodiment of the present invention. Similarly to the QoS edge controller 301, 301_1, 301_2, . . . , 301_n, the QoS core controller 302 generates in step 1801 a configuration information (e.g., one or more new and/or amended TFTs and/or one or more new and/or amended ARPs) according to a QCI of a new or amended QoS class. The step 1801 is executed in the same way as described above with regard to the step 1611.

Then, the QoS core controller 302 transmits in step 1802 the configuration information (e.g., the one or more new and/or amended TFTs and/or the one or more new and/or amended ARPs) to one or more nodes or devices 1800 of the core network 202. The configuration information transmission 1802 is executed in the same way as described above with regard to step 1612 with the difference that, while in the QoS edge controller 301, 301_1, 301_2, . . . , 301_n example according to FIG. 16 one or more APs 1601 of the sub-network 201_1, . . . , 201_n (i.e. of the RAN or edge network respectively) receive the configuration information, in step 1802 one or more nodes or devices 1800 of the core network 202 receive said configuration information. In this way, the one or more nodes or devices of the core network are configured according to the configuration information (e.g., the one or more new and/or amended TFTs and/or the one or more new and/or amended ARPs), i.e. they update their data and/or settings, if necessary, and operate according to the received configuration information (e.g., by use of the one or more new and/or amended TFTs and/or one or more new and/or amended ARPs).

According to the present embodiment, each one of the one or more nodes or devices 1800 of the core network 202 transmit in step 1803 a modification response to the QoS core controller 302. The step 1803 is executed in the same way as the above described step 1615 with the difference that the one or more nodes or devices 1800 of the core network 202 transmit 1803 the modification response. According to an embodiment, the modification response comprises an indication, indicating whether the configuration according to the configuration information and/or the reception 1802 of the configuration information succeeded or failed. The execution of the step 1803 is optional. Thus, embodiments exist, in which the transmission 1803 of the modification response is not mandatory or necessary.

Here, it has to be noted that the configuration information comprising one or more new and/or amended TFTs and/or one or more new and/or amended ARPs, as discussed above with regard to FIGS. 16 to 18, is just exemplary. According to embodiments of the present invention, the configuration information may include also other and/or additional data and/or parameters that are to be amended in view of an amended or new QoS class.

Thus, embodiments of the present invention relate to a quality of service, QoS, class indicator, QCI, structure, wherein the QCI structure is arranged to control communication in a communication network and to classify data flows in the communication network, and wherein the QCI structure comprises: an identifier of a provider of an industry vertical and/or of a service in the communication network; and a QoS parameter set for the provider of the industry vertical and/or of the service. A QoS central controller is configured to manage QoS classes in the communication network according to the QCI structure. Each one of one or more QoS sub-network controllers is arranged to configure devices in a respective sub-network of the communication network according to the QCI structure.

As described above, embodiments of the present invention provide a solution for an improved handling of different data flows in a communication network according to different QoS classes.

Additionally, it has to be pointed out that embodiments of the present invention is applicable to different kinds of communication networks. For example, the QCI structure is applicable in both 3GPP and non-3GPP access networks. The architecture, introduced by embodiments of the present invention, facilitates QoS support for not only cellular links but also for Device-to-Device (D2D) communications and/or side link type of communications. Embodiments of the present invention facilitates a faster introduction of new QoS classes, thereby allowing MNOs to differentiate their service portfolio by rapidly deploying new services in both consumer and enterprise business segments.

For the communication purposes, different known communication standards and/or protocols can be used according to embodiments of the present invention.

Further, the present invention is implementable in a modular way. Thus, the embodiments described above may be combined with each other in several ways.

The invention has been described in conjunction with various embodiments herein. However, other variations to the enclosed embodiments can be understood and effected by those skilled in the art and practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

What is claimed is:

1. A quality of service (QoS) central controller comprising:
   a processor; and
   a memory coupled to the processor and having processor-executable instructions stored thereon, which, when executed by the processor, cause the QoS central controller to:
      manage QoS classes in a communication network using a QoS class indicator (QCI) structure, wherein the QCI structure is arranged to control communication in the communication network and to classify data flows in the communication network, and wherein the QCI structure comprises:
         (a) an identifier of a provider of an industry vertical and/or a provider of a service in the communication network; and
         (b) a QoS parameter set for the provider of the industry vertical and/or the provider of the service,
            wherein each QoS class is identified by a QCI that is arranged according to the QCI structure.

2. The QoS central controller according to claim 1, wherein the communication network comprises one or more sub-networks, and wherein, in view of the one or more sub-networks, the identifier is an identifier of the provider of the industry vertical and/or the provider of the service in a respective sub-network and the QoS parameter set comprises QoS parameters in the respective sub-network for the provider of the industry vertical and/or the provider of the service.

3. The QoS central controller according to claim 1, wherein the QoS parameter set is variable.

4. The QoS central controller according to claim 1, wherein the instructions further cause the QoS central controller to implement at least one of the following:
   authorizing the provider of the industry vertical and/or the provider of the service in the communication network;
   generating a new QoS class by generating at least one new QCI according to the QCI structure and adding the at least one new QCI to a QCI set managed by the QoS central controller;
   amending one or more of the QoS classes by amending in the QCI set at least one QCI, which identifies the QoS class to be amended; and
   deleting one or more of the QoS classes by deleting in the QCI set at least one QCI, which identifies the QoS class to be deleted.

5. The QoS central controller according to claim 4, wherein the instructions further cause the QoS central controller to generate the new QoS class by:
   receiving a new QoS class request of the provider of the industry vertical and/or the provider of the service in the communication network for generating the new QoS class, wherein the new QoS class request indicates a requested new QoS parameter set, comprising QoS parameters for the new QoS class; and
   generating at least one new QCI comprising an identifier of the provider of the industry vertical and/or the provider of the service, which requests the generation of the new QoS class, and a new QoS parameter set for the provider of the industry vertical and/or the provider of the service, which requests the generation of the new QoS class, wherein the new QoS parameter set is generated according to the requested new QoS parameter set.

6. The QoS central controller according to claim 4, wherein the instructions further cause the QoS central controller to generate the new QoS class by:
   receiving a new QoS class request of the provider of the industry vertical and/or the provider of the service in the communication network for generating the new QoS class, wherein the new QoS class request indicates a requested new QoS parameter set, comprising QoS parameters for the new QoS class; and
   for each sub-network of the one or more sub-networks of the communication network, performing the following:
      verifying the new QoS class request in view of policies allowed for the provider of the industry vertical and/or the provider of the service in a respective sub-network and/or in the communication network; and
      in response to the new QoS class request being allowable in view of the policies in the respective sub-network and/or in the communication network,
         verifying capabilities of the sub-network towards the provider of the industry vertical and/or the provider of the service in a respective sub-network, and
         generating, for the respective sub-network, a corresponding new QCI for the provider of the industry vertical and/or the provider of the service, which requests the generation of the new QoS class.

7. The QoS central controller according to claim 6, wherein the corresponding new QCI comprises an identifier of the provider of the industry vertical and/or the provider of the service, which requests the generation of the new QoS class at the respective sub-network and a corresponding QoS parameter set in the respective sub-network for the provider of the industry vertical and/or the provider of the service, which requests the generation of the new QoS class.

8. The QoS central controller according to claim 6, wherein the instructions further cause the QoS central controller to:
   generate the corresponding QoS parameter set for the provider of the industry vertical and/or the provider of the service, which requests the generation of the new QoS class, according to the capabilities of the network or sub-network towards the provider of the industry vertical and/or the provider of the service in the respective sub-network and according to the requested new QoS parameter set.

9. The QoS central controller according to claim 4, wherein the instructions further cause the QoS central controller to amend the one or more of the QoS classes by:
   receiving a QoS class amendment request of the provider of the industry vertical and/or the provider of the class of service in the communication network for amending the one or more of the QoS classes, wherein the QoS class amendment request indicates a requested amended QoS parameter set, comprising QoS parameters for the one or more of the QoS classes to be amended;
   determining in the QCI set at least one QCI, which identifies the one or more of the QoS classes to be amended; and amending the one or more of the QoS classes by amending the at least one determined QCI according to the requested amended QoS parameter set.

10. The QoS central controller according to claim 4, wherein the instructions further cause the QoS central controller to amend the one or more of the QoS classes by:
receiving a QoS class amendment request of the provider of the industry vertical and/or the provider of the service in the communication network for amending the one or more of the QoS classes, wherein the QoS class amendment request indicates a requested amended QoS parameter set, comprising QoS parameters for the one or more of the QoS classes to be amended; and
for each sub-network of the one or more sub-networks of the communication network, performing the following:
determining in the QCI set a corresponding QCI, which identifies the one or more of the QoS classes to be amended for a respective sub-network; and
verifying capabilities of the sub-network towards the provider of the industry vertical and/or the provider of the service in the respective sub-network, and amending the QOS parameter set of the corresponding QCI according to the requested amended QoS parameter set and according to the capabilities of the sub-network towards the provider of the industry vertical and/or the provider of the service in the respective sub-network.

11. The QoS central controller according to claim 4, wherein the instructions further cause the QoS central controller to delete the one or more of the QoS classes by:
receiving a QoS class deletion request of the provider of the industry vertical and/or the provider of the service in the communication network for deleting the one or more of the QoS classes;
determining in the QCI set at least one QCI, which identifies the provider of the industry vertical and/or the provider of the service; and
deleting the one or more of the QoS classes by deleting from the QCI set the determined at least one QCI.

12. The QoS central controller according to claim 4, wherein the instructions further cause the QoS central controller to delete the one or more of the QoS classes by:
receiving a QoS class deletion request of the provider of the industry vertical and/or the provider of the service in the communication network for deleting the one or more of the QoS classes; and
for each sub-network of the one or more sub-networks of the communication network, performing the following:
determining in the QCI set a corresponding QCI, which identifies the one or more of the QoS classes to be deleted for a respective sub-network; and
deleting in the QCI set the determined corresponding QCI.

13. A quality of service (QoS) central control method comprising:
managing QoS classes in a communication network using a QoS class indicator (QCI) structure, wherein the QCI structure is arranged to control communication in the communication network and to classify data flows in the communication network, and wherein the QCI structure comprises:
(a) an identifier of a provider of an industry vertical and/or provider of a service in the communication network; and
(b) a QoS parameter set for the provider of the industry vertical and/or the provider of the service,
wherein each QoS class is identified by a QCI that is arranged according to the QCI structure.

14. A quality of service (QoS) sub-network controller comprising:
a processor; and
a memory coupled to the processor and having processor-executable instructions stored thereon, which, when executed by the processor, cause the QoS sub-network controller to:
configure devices in a sub-network of a communication network using QoS classes identified by a QoS class indicator (QCI) that is arranged according to a QCI structure, wherein the QCI structure is arranged to control communication in the communication network and to classify data flows in the communication network, and wherein the QCI structure comprises:
(a) an identifier of a provider of an industry vertical and/or a provider of a service in the communication network; and
(b) a QoS parameter set for the provider of the industry vertical and/or the provider of the service.

15. The QoS sub-network controller according to claim 14, wherein the instructions cause the QoS sub-network controller to:
configure the devices in the sub-network in response to a reception of a QoS class related request, wherein the QoS class related request is a request to add a new QoS class to the QoS classes, to amend a QoS class of the QoS classes, or to delete a QoS class of the QoS classes.

16. The QoS sub-network controller according to claim 14, wherein the instructions cause the QoS sub-network controller to receive the QoS class related request from a QoS central controller.

17. The QoS sub-network controller according to claim 14, wherein the sub-network is a core network or a radio access network.

18. The QoS sub-network controller according to claim 14, wherein the sub-network, in which the QoS sub-network controller configures devices using the QoS classes, is a radio access network (RAN) or an edge network, and the instructions cause the QoS sub-network controller to:
generate configuration information according to a QCI of a new or amended QoS class of the QoS classes; and
transmit the configuration information to one or more access points of the sub-network such that each one of the one or more access points of the sub-network is enabled to configure one or more user communication devices connected to a respective access point according to the configuration information.

19. A quality of service (QoS) sub-network control method comprising:
configuring devices in a sub-network of a communication network using QoS classes identified by a QoS class indicator (QCI) that is arranged according to a QCI structure, wherein the QCI structure is arranged to control communication in the communication network and to classify data flows in the communication network, and wherein the QCI structure comprises:
(a) an identifier of a provider of an industry vertical and/or a provider of a service in the communication network; and
(b) a QoS parameter set for the provider of the industry vertical and/or the provider of the service.

* * * * *

UNITED STATES PATENT AND TRADEMARK OFFICE
CERTIFICATE OF CORRECTION

PATENT NO. : 10,959,130 B2  
APPLICATION NO. : 16/362342  
DATED : March 23, 2021  
INVENTOR(S) : Nunna et al.

Page 1 of 1

It is certified that error appears in the above-identified patent and that said Letters Patent is hereby corrected as shown below:

In the Claims

Claim 6: Column 32, Line 29: "vider of the service in a respective sub-network," should read -- vider of the service in the respective sub-network, --.

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*